United States Patent
Watanabe et al.

(10) Patent No.: US 10,139,574 B2
(45) Date of Patent: Nov. 27, 2018

(54) MULTI-CORE CONNECTOR, CONNECTOR, AND CONNECTOR CONNECTION MECHANISM

(71) Applicant: FURUKAWA ELECTRIC CO., LTD., Chiyoda-ku, Tokyo (JP)

(72) Inventors: Kengo Watanabe, Tokyo (JP); Tsunetoshi Saito, Tokyo (JP); Katsuki Suematsu, Tokyo (JP); Mitsuhiro Iwaya, Tokyo (JP); Kohei Kawasaki, Tokyo (JP); Masahito Morimoto, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 9 days.

(21) Appl. No.: 15/443,987

(22) Filed: Feb. 27, 2017

(65) Prior Publication Data

US 2017/0168247 A1   Jun. 15, 2017

Related U.S. Application Data

(63) Continuation of application No. PCT/JP2015/073408, filed on Aug. 20, 2015.

(30) Foreign Application Priority Data

Aug. 29, 2014 (JP) .................. 2014-175248
Mar. 18, 2015 (JP) .................. 2015-054547

(51) Int. Cl.
*G02B 6/38* (2006.01)
*G02B 6/40* (2006.01)

(52) U.S. Cl.
CPC ......... *G02B 6/3885* (2013.01); *G02B 6/3834* (2013.01); *G02B 6/3839* (2013.01); *G02B 6/3843* (2013.01); *G02B 6/40* (2013.01)

(58) Field of Classification Search
CPC .................. G02B 6/3885; G02B 6/02042
(Continued)

(56) References Cited

U.S. PATENT DOCUMENTS 5,259,050 A * 11/1993 Yamakawa .......... G02B 6/3885
                                                              385/114
5,620,634 A *  4/1997 Shahid ............... B29D 11/0075
                                                              264/1.25
(Continued)

FOREIGN PATENT DOCUMENTS

JP    11-133269 A    5/1999
JP    11-352359 A   12/1999
(Continued)

OTHER PUBLICATIONS

International Search Report in PCT/JP2015/073408, dated Nov. 17, 2015.
(Continued)

*Primary Examiner* — Robert Tavlykaev
(74) *Attorney, Agent, or Firm* — Hauptman Ham, LLP

(57) ABSTRACT

A plurality of holes are formed in a ferrule. The holes are at sites penetrated by the tips of optical fibers. An opening is formed in the upper surface of the ferrule and an internal housing section is exposed from the opening. The housing section is at a site at which an optical fiber holding member is housed. The optical fibers are held by the optical fiber holding member. The optical fibers are multi-core fibers. In other words, the optical fibers have a specified axis of symmetry in a cross-section vertical to the longitudinal direction of the optical fibers and have orientation relative to a rotation direction having the longitudinal direction as the axis thereof.

14 Claims, 35 Drawing Sheets

(58) Field of Classification Search
USPC .................................................. 385/76–81
See application file for complete search history.

(56) References Cited

U.S. PATENT DOCUMENTS

| | | | |
|---|---|---|---|
| 6,062,740 A | 5/2000 | Ohtsuka et al. | |
| 6,352,372 B1* | 3/2002 | Shahid | G02B 6/3879 |
| | | | 385/136 |
| 6,817,777 B1* | 11/2004 | Grabbe | G02B 6/3882 |
| | | | 385/53 |
| 8,858,089 B2* | 10/2014 | Bradley | G02B 6/3885 |
| | | | 385/60 |
| 9,372,304 B2* | 6/2016 | Bradley | G02B 6/3885 |
| 9,696,513 B2* | 7/2017 | Bennett | G02B 6/4482 |
| 2002/0150349 A1* | 10/2002 | Shahid | G02B 6/3878 |
| | | | 385/65 |
| 2004/0037510 A1* | 2/2004 | Mukouda | G02B 6/3833 |
| | | | 385/71 |
| 2005/0213922 A1 | 9/2005 | Sezerman et al. | |
| 2006/0245695 A1 | 11/2006 | Fujiwara et al. | |
| 2011/0064361 A1 | 3/2011 | Seng | |
| 2011/0229086 A1 | 9/2011 | Bradley et al. | |
| 2012/0051706 A1* | 3/2012 | van Geffen | G02B 6/3833 |
| | | | 385/134 |
| 2013/0074551 A1* | 3/2013 | Sasaoka | C03B 37/01222 |
| | | | 65/386 |
| 2015/0063755 A1* | 3/2015 | Doany | G02B 6/02042 |
| | | | 385/59 |
| 2015/0205053 A1 | 7/2015 | Aoki et al. | |
| 2016/0223761 A1* | 8/2016 | Nakanishi | G02B 6/3843 |
| 2018/0067267 A1* | 3/2018 | Smith | G02B 6/3851 |

FOREIGN PATENT DOCUMENTS

| | | |
|---|---|---|
| JP | 2003-156648 A | 5/2003 |
| JP | 2004-109949 A | 4/2004 |
| JP | 2005-181781 A | 7/2005 |
| JP | 2013-522679 A | 6/2013 |
| JP | 2013-522680 A | 6/2013 |
| WO | 2011/116133 A1 | 9/2011 |
| WO | 2011/116137 A1 | 9/2011 |
| WO | 2014/021215 A1 | 2/2014 |

OTHER PUBLICATIONS

Office Action in JP Application No. 2016-545471, dated Oct. 11, 2016.

Decision to Grant a Patent in JP Application No. 2016-545471, dated Jan. 31, 2017.

* cited by examiner difficult to have a uniform outer shape and core arrangement along the entire length of the multi-core fiber because of manufacturing reasons.

On the other hand, with a method in which multi-core fibers are fixed to a ferrule of a multi-core connector by performing rotational alignment one at a time, low yield rate due to mal-alignment may occur. For example, let the yield rate of alignment of a multi-core fiber be 90% (i.e. 10% of mal-alignment occurs).

For a single-core connector, the yield rate of the connector is 90%. However, for a multi-core connector in which a plurality of multi-core fibers are all required to be aligned, the yield rate of the connector drops significantly. For a multi-core connector of eight cores, for example, a probability that every multi-core fiber can be well aligned is eighth power of 90%. Thus, for a multi-core connector, one mal-alignment may result in a defective connector as a whole.

In addition, in connecting multi-core fibers together as in Patent Document 2, it is necessary that all the cores of the multi-core fibers are optically connected by physical contact. However, it is difficult to have completely the same protrusion height of the multi-core fibers at the tip part of the connector, and, in this case, it is difficult to bring the multi-core fibers with low protrusion heights into physical contact with certainty. Thus, a connector or the like that can bring multi-core fibers into physical contact with a connection target with certainty has been in demand.

The present invention was achieved in view of such problems. Its object is to provide a multi-core connector and the like that can minimize lowering of a yield rate even if the connector includes a plurality of optical fibers, such as multi-core fibers, that need rotational alignment.

Means for Solving Problems

To achieve the above object, a first invention is a multi-core connector including a plurality of optical fibers, an optical fiber holding member that holds at least one of the optical fibers, and a ferrule having a housing section that houses a plurality of the optical fiber holding members and a positioning mechanism that determines a position of a tip of the optical fiber protruding from an end face of the optical fiber holding member. The optical fiber has a particular axis of symmetry and has an orientation in a rotational direction having the longitudinal direction as an axis of rotation at a cross section perpendicular to a longitudinal direction thereof. The optical fiber holding member includes a rotation restraining part provided, which restrains the rotation of the optical fiber holding member inside the housing section with a longitudinal direction of the optical fiber holding member as an axis of rotation.

It is preferable that the optical fiber holding member has a mark formed. When viewed from a longitudinal direction of the optical fiber holding member, the mark is preferably parallel or perpendicular to the axis of symmetry of the optical fiber that is to be housed therein.

The optical fiber holding member may be in a substantially rectangular column shape, and when ah represents a width and bh represents a height of the optical fiber holding member at a cross section perpendicular to the longitudinal direction of the optical fiber holding member, the height hs of the housing section may be greater than the height bh of the optical fiber holding member, and θ may be 1 degree or less in a relation: ah·sin θ+bh·cos θ=hs.

A guiding portion may be provided on the housing section, and the optical fiber holding member and the guiding portion may be fitted with each other with a clearance in between. The clearance may be set so that an angle of rotational allowance of the optical fiber holding member against the guiding portion is 1 degree or less.

There may be no clearance provided between the housing section and the optical fiber holding member, and the rotation restraining part may forbid the rotation of the optical fiber holding member.

The rotation restraining part may be a flat portion that is formed on at least one part of an outer surface of the optical fiber holding member, and the rotation of the optical fiber holding member may be restrained by making the flat portion contact with a reference surface of the housing section.

The rotation restraining part may be a protrusion portion or a recess portion that is formed on at least one part of an outer surface of the optical fiber holding member, and the rotation of the optical fiber holding member may be restrained by fitting the protrusion portion or the recess portion into a recess portion or a protrusion portion formed on the housing section.

The rotation restraining part may be a dummy rod or a dummy fiber. The dummy rod or the dummy fiber protrudes from an end face of the optical fiber holding member in the same direction as the optical fiber, and the rotation of the optical fiber holding member may be restrained by disposing the dummy rod or the dummy fiber at the positioning mechanism.

It is preferable that each of the optical fibers protrudes from an end face of the ferrule for a predetermined amount.

It is preferable that the optical fiber holding member is fixed to the ferrule with an adhesive agent and an inner face of the positioning mechanism and the optical fiber are not adhered to each other.

An end face of the optical fiber protruding from and end face of the ferrule may be polished.

Not all the positioning mechanisms may have the optical fiber disposed and a vacant positioning mechanism may be provided.

The optical fiber may be a multi-core fiber including a plurality of cores.

It is preferable that, for each of the optical fibers, the maximum difference in length from an end face of the ferrule to an end face of each of cores of the multi-core fiber is 0.3 μm or less.

The single optical fiber holding member may hold the single optical fiber.

The single optical fiber holding member may hold the two optical fibers.

Guide pins or guide holes may be provided on both sides of a plurality of the optical fibers.

According to the first invention, an optical fiber that needs rotational alignment is not directly fixed to a ferrule but is held by an optical fiber holding member. Thus, the rotational alignment of the optical fiber should be performed only for the optical fiber holding member. For this reason, even if alignment is failed, it is necessary to abolish only the subjected optical fiber holding member. Thus, the connector as a whole is not defected and lowering of the yield rate of the connector can be suppressed.

Also, the optical fiber holding member has a rotation restraining part formed therein. Thus, it is possible to arrange the optical fiber holding members easily with the same rotational direction when being fixed to a housing section of a ferrule.

Also, if a mark indicating an orientation of the optical fiber to be housed is formed when viewed from the longitudinal direction of the optical fiber holding member, the optical fiber and the optical fiber holding member can be easily aligned.

Also, the optical fiber holding member is in a substantially rectangular column shape. By setting θ to 1 degree or less in a relation: ah·sin θ+bh·cos θ=hs, wherein ah represents a width and bh represents a height of the optical fiber holding member, and hs represents the height of the housing section, an angle of rotation can be suppressed to 1 degree or less even if the optical fiber holding member rotates inside the housing section.

Also, similar effects can be obtained by providing a guiding portion on the housing section and limiting the angle of rotation of the optical fiber holding member against the guiding portion to 1 degree or less.

The shifting of the optical fiber in the rotational direction can be further suppressed with certainty by not providing a clearance between the housing section and the optical fiber holding member so as to forbid the rotation of the optical fiber.

Also, if the rotation restraining part is a flat portion which is formed on at least a part of an outer face of the optical fiber holding member, manufacturing thereof is easy and the rotation of the optical fiber holding member can be restrained by contacting with a reference surface of the housing member.

Also, if the rotation restraining part is a protrusion portion or a recess portion which is formed on at least a part of an outer face of the optical fiber holding member, the rotation of the optical fiber holding member can be restrained by fitting the protrusion portion or the recess portion with a recess portion or a protrusion portion formed on the housing section.

Also, similar effects can be obtained if the rotation restraining part is a dummy rod or a dummy fiber provided in the optical fiber holding member and the dummy rod or the dummy fiber is disposed at a positioning mechanism of the ferrule.

Also, by protruding the optical fiber from an end face of the ferrule for a predetermined amount, the optical fiber can be optically connected with the connection target with certainty.

Also, the optical fiber holding member is fixed to the ferrule with adhesive agent, and at this time, by avoiding an inner face of the positioning mechanism and the optical fiber to be adhered to each other, a sufficient length of the optical fiber that can be elastically compressed can be secured. For this reason, even if there is a slight variation in the protrusion amount of the optical fiber from the end face of the ferrule, the optical fiber absorbs this variation by elastic compression deformation and pressing force required between the each optical fiber and the connection target can be secured with certainty when the each optical fiber is pressed against a connection target.

Also, if the tip of the optical fiber protruding from and end face of the ferrule is polished, scratches or the like as well as edge parts of the tip of the optical fiber are eliminated thus making the tip shape of the optical fiber into a shape that is preferable for physical contact.

Also, not all the positioning mechanisms of the ferrule may have the optical fibers disposed. If the positioning mechanisms are formed on the ferrule at a predetermined pitch and the optical fibers are disposed at only the positioning mechanisms that are to be used, then the ferrule can be commonly used independent of the arrangement of the optical fibers.

Also, if the optical fiber is a multi-core fiber including a plurality of cores, it is easy to connect a plurality of multi-core fibers altogether.

Also, if the single optical fiber holding member holds the single optical fiber, lowering of the yield rate due to above-mentioned mal-alignment can be minimized.

Also, if the single optical fiber holding member holds the two optical fibers, the two optical fibers and the holes on the ferrule can perform the rotational positioning.

Also, providing guide pins or guide holes on both sides of the optical fibers allows the connector to be used as a so-called MT connector (Mechanically Transferable Splicing Connector) having a guiding mechanism. Thus, the connector can be handled in the same way as the conventional connectors.

A second invention is a connector including a multi-core fiber which includes a plurality of cores and a cladding that covers the cores altogether, a ferrule that holds a plurality of the multi-core fibers and includes a hole through which the multi-core fiber is inserted, and an elastic member that presses the ferrule in a direction of a tip thereof. A tip of the multi-core fiber protrudes from an end face of the ferrule, and the multi-core fiber is not fixed to the hole of the ferrule and is fixed at a rear part of the hole. When the multi-core fiber is butted against a connection target, the multi-core fiber is pressed to the connection target by means of an elastic compression distortion without buckling.

When a minimum circle that includes mode field diameters of all the cores with a center of the multi-core fiber as the center in a cross section of the multi-core fiber taken in a direction perpendicular to a longitudinal direction is regarded as a reference circle, and the difference between a protrusion margin at a part where the tip of the multi-core fiber protrudes the most and a protrusion margin at a part where the protrusion margin of the tip of the multi-core fiber is minimum inside the reference circle is regarded as $\Delta$, it is preferable that a relationship:

$$\Delta \leq 14.8/a$$

is satisfied, wherein a ($\mu$m) represents a radius of the reference circle.

It is preferable that a relationship:

$$\delta h \cdot d^2 / l \leq (X/n - 2) \times 35.2$$

is satisfied, wherein d ($\mu$m) represents a cladding diameter of the multi-core fiber, n represents a number of cores of the multi-core fiber, $\delta h$ ($\mu$m) represents a difference between a protrusion height of the multi-core fiber with the maximum protrusion height and a protrusion height of the multi-core fiber with the minimum protrusion height, l ($\mu$m) represents a length from an end face of a fixing part of the multi-core fiber with the ferrule to a tip of the multi-core fiber, and X (N) represents an effective pressing force pressed by the elastic member.

The effective pressing force X may be 40 (N) or may be 22 (N).

Every protrusion height of the multi-core fiber from an end face of the ferrule may be 5 $\mu$m or more.

According to the second invention, the multi-core fiber is not fixed to the hole of the ferrule and is fixed at the rear part of the hole so a sufficient length of the multi-core fiber that can be elastically compressed can be secured. For this reason, even if there are any variations in the protrusion amount of the multi-core fiber from the end face of the ferrule, the multi-core fiber absorbs this variation by elastic compression distortion without buckling when each of the multi-core fiber is pressed against a connection target.

Also, since the relationship: $\Delta \leq 14.8/a$ is satisfied, wherein $\Delta$ represents the difference between a protrusion margin at a part where the tip of the multi-core fiber protrudes the most and a protrusion margin at a part where the protrusion margin of the tip of the multi-core fiber is minimum inside the reference circle, required pressing force for all the cores of the connection target can be secured with certainty.

Also, since the relationship: $\delta h \cdot d^2/l \leq (X/n-2) \times 35.2$ is satisfied, wherein X (N) represents the effective pressing force pressed by the elastic member, required pressing force for all the cores of the connection target can be secured by the pressing force of the elastic member with certainty.

Here, the effective pressing force is 80% of the elastic force that can be yielded by the elastic member. That is, it is the pressing force yielded in the 80% of the maximum displacement of the elastic member when transformed within an elastically deformable range.

Also, by protruding the multi-core fiber for 5 $\mu$m or more from the end face of the ferrule, optical connection with the connection target can be performed with certainty. Also, the influence by glass fillers or the like included in the ferrule can be reduced.

Also, by making the maximum difference in the distance from the end face of the ferrule to the end face of each of the cores of the multi-core fiber 0.3 $\mu$m or less, required pressing force for each of the cores to be connected with the connection target can be secured.

A third invention is a connector connection structure that includes a pair of connectors connected with each other. At least one of the connectors is the connector according to the first invention and the multi-core fibers of each of the connectors are optically connected with each other.

When a pair of the connectors are the connectors according to the first invention, and a minimum circle that includes mode field diameters of all the cores with a center of the multi-core fiber as the center in a cross section of the multi-core fiber taken in a direction perpendicular to a longitudinal direction of the multi-core fiber is regarded as a reference circle, and in each of the connectors, the difference between a protrusion margin at a part where the tip of the multi-core fiber protrudes the most and a protrusion margin at a part where the protrusion margin of the tip of the multi-core fiber is minimum inside the reference circle is regarded as $\Delta_1$ and $\Delta_2$ respectively, it is preferable that a relationship:

$$(\Delta_1 + \Delta_2) \, (\mu m) \leq 29.6/a$$

is satisfied, wherein a ($\mu$m) represents a radius of the reference circle.

Only one of a pair of the connectors may be the connector according to the first invention and a multi-core fiber of the other connector may be fixed to a hole of a ferrule of the other connector.

In this case, an end face of a ferrule of the other connector may be flat polished along with a multi-core fiber.

According to the third invention, in at least one of the connectors, the multi-core fiber is not fixed to the hole of the ferrule and is fixed at the rear part of the hole so a sufficient length of the multi-core fiber that can be elastically compressed can be secured. For this reason, even if there is any variation in the protrusion height of the multi-core fiber from the end face of the ferrule, the multi-core fiber absorbs this variation by elastic compression distortion without buckling when each of the multi-core fibers is pressed against the connection target.

Also, since the relationship: $2\Delta \leq 29.6/a$ is satisfied, wherein $\Delta$ represents the difference between a protrusion margin at a part where the tip of the multi-core fiber protrudes the most and a protrusion margin at a part where the protrusion margin of the tip of the multi-core fiber is minimum inside the reference circle, required pressing force for all the cores of the connection target can be secured with certainty.

Also, using the connector according to the first invention only for one of the connectors and fixing the multi-core fiber to the hole of the ferrule in the other connector in a conventional way facilitate fixing of the multi-core fiber to the connector.

Also, in this case, flat polishing of the end face of the other connector can make the end face of the multi-core fiber substantially smooth and flat, so that the difference between the heights of the cores of the multi-core fibers can be diminished. Also in this case, by using the connector according to the first invention for one of the connectors, the multi-core fibers of the both connectors can be brought into physical contact with certainty.

Effects of the Invention

The present invention can provide a multi-core connector and the like that can minimize lowering of a yield rate even if the connector includes a plurality of optical fibers, such as multi-core fibers, that need rotational alignment.

BRIEF DESCRIPTION OF DRAWINGS

FIG. 5 (b) is a drawing showing a state after the optical fiber 13 is inserted into the optical fiber holding member 11.

FIG. 6 (b) is a drawing showing the optical fiber holding member 11 viewed from its front at the time of alignment.

FIG. 8 (b) is an enlarged schematic view of H section in FIG. 8 (a).

FIG. 9 (b) is a drawing showing the assembly process of the multi-core connector 1.

FIG. 11 (b) is a schematic view showing a state in which tips of the optical fibers 13 are polished.

FIG. 12 (b) is a cross sectional view showing another embodiment of the rotation restraining part.

FIG. 12 (c) is a cross sectional view showing another embodiment of the rotation restraining part.

FIG. 14 (b) is a cross sectional view showing another embodiment of the rotation restraining part.

FIG. 14 (c) is a cross sectional view showing another embodiment of the rotation restraining part.

FIG. 15 (b) is a cross sectional view taken along the line N-N in FIG. 5 (a).

FIG. 19 (b) is a front view showing another embodiment.

FIG. 20 (b) is a cross sectional view taken along the line O-O in FIG. 20 (a).

FIG. 20 (c) is a cross sectional view showing another embodiment of FIG. 20 (b).

FIG. 21 (b) is a schematic view showing a light emitting/receiving element array that is to be connected with the multi-core connector 1b.

FIG. 22 (a) is a drawing showing another embodiment and is a drawing showing an optical fiber 13a.

FIG. 22 (b) is a drawing showing another embodiment and is a drawing showing an optical fiber 13b.

FIG. 26 (b) is a drawing showing a state in which the multi-core fibers 113 are butted against each other.

FIG. 27 (b) is a front view of the multi-core fiber 113.

FIG. 28 (b) is a drawing showing a state in which ends of the multi-core fibers 113 are pressed against each other to be in physical contact with each other.

FIG. 31 (b) is a drawing showing the assembly process of the multi-core connector 100.

DESCRIPTION OF SOME EMBODIMENTS

<Multi-Core Connector>

Figure 1:
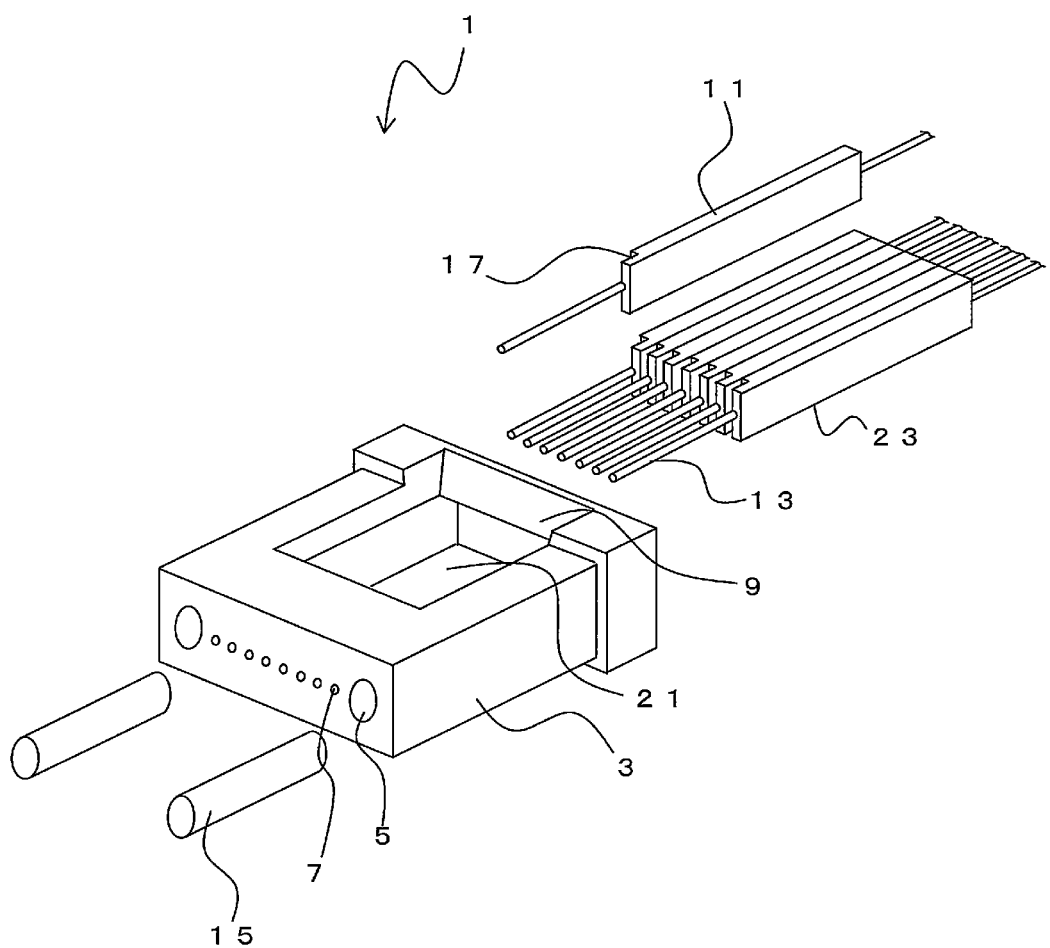
FIG. 1 is an exploded perspective view showing a multi-core connector 1.
Figure 2:
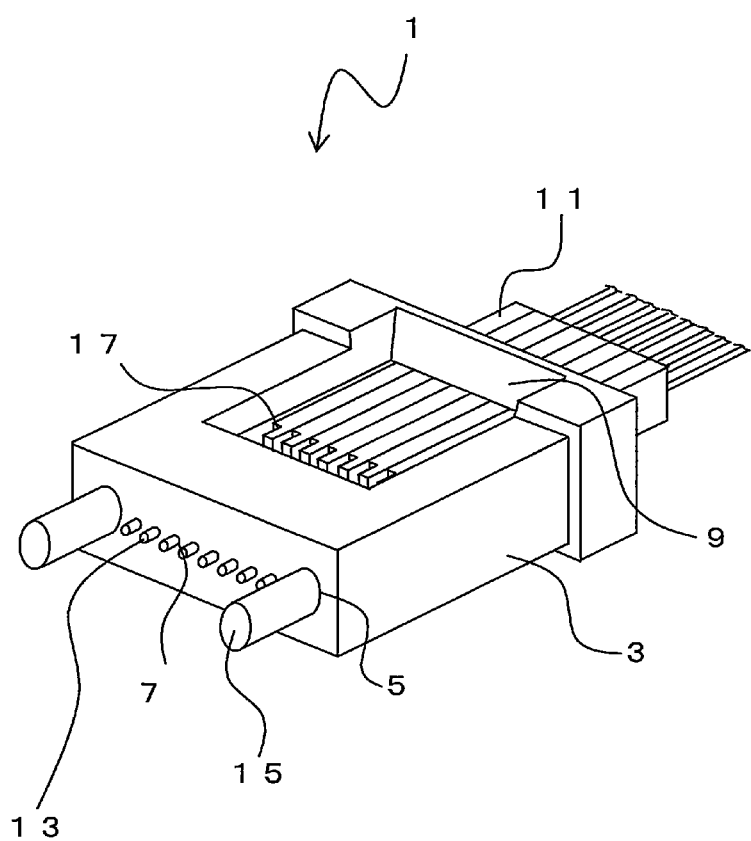
FIG. 2 is an assembled perspective view showing the multi-core connector 1.
Figure 3:
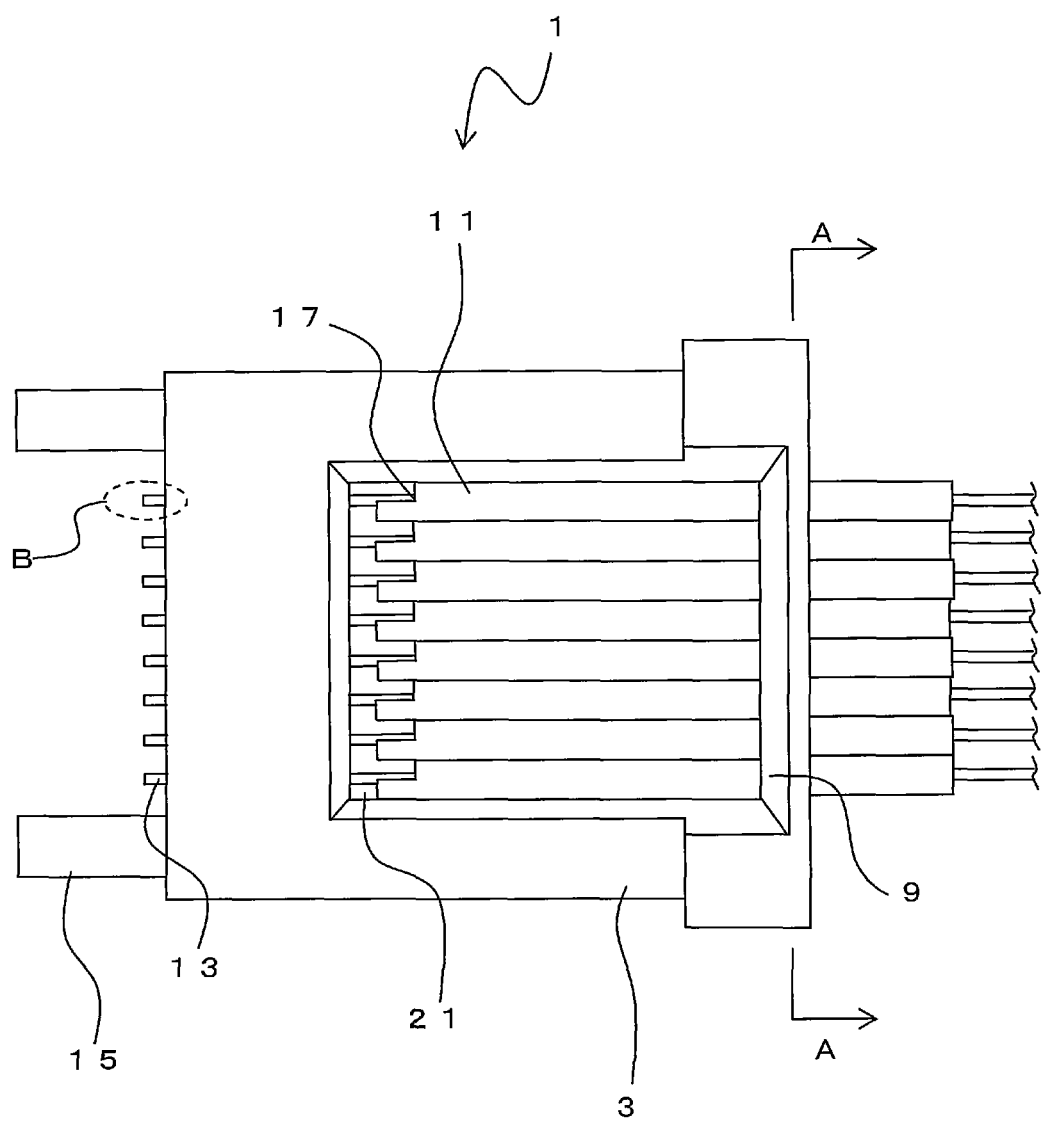
FIG. 3 is a plan view showing the multi-core connector 1.

Hereinafter, a multi-core connector 1 according to an embodiment of the present invention will be described. FIG. 1 to FIG. 3 are drawings to illustrate the multi-core connector 1; FIG. 1 is an exploded perspective view, FIG. 2 is an assembled perspective view, and FIG. 3 is a plan view. The multi-core connector 1 mainly includes a ferrule 3, optical fiber holding members 11, optical fibers 13, and so on.

A plurality of holes 7 are formed on the ferrule 3 as positioning mechanisms. The holes 7 are the parts through which the tips of the optical fibers 13 are inserted. Alternatively, grooves, for example, may be provided as positioning mechanisms instead of the holes 7. In short, a plurality of the optical fibers 13 are disposed at a plurality of positioning mechanisms. In the descriptions hereinafter, it is assumed that holes are provided as the positioning mechanisms for the ferrule 3. In addition, on an end face of the ferrule 3, guide holes 5 are formed on both side parts of a plurality of the holes 7. Guide pins 15 are inserted into the guide holes 5. The guide pins 15 determine the positioning with a connection target such as a connector.

On a top surface of the ferrule 3, an opening 9 is formed and the opening 9 exposes an inner housing section 21. The housing section 21 is a part in which the optical fiber holding members 11 are to be housed.

The optical fiber holding member 11 holds the optical fiber 13. The optical fiber 13 is a multi-core fiber having a circular cross section. That is, the optical fiber 13 has a particular axis of symmetry on a cross section perpendicular to a longitudinal direction of the optical fiber 13 and has an orientation in a rotational direction with the longitudinal direction as an axis of rotation. Thus, the optical fiber 13 needs a rotational alignment.

As shown in FIG. 3, a plurality of the optical fiber holding members 11 are housed in the housing section 21 aligned. The optical fiber 13 protrudes from an end face of the optical fiber holding member 11 for a predetermined length. The optical fiber that protrudes from the optical fiber holding member 11 penetrates the hole 7 formed on the ferrule 3 and protrudes from an end face of the ferrule 3 for a predetermined length. Thus, the tip of the optical fiber protruding from the end face of the optical fiber holding member 11 is positioned by the hole 7, which is a positioning mechanism.

Figure 4:
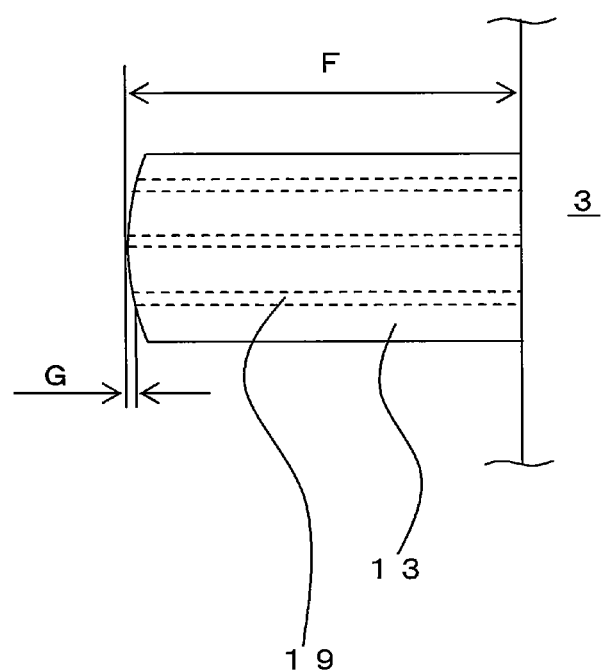
FIG. 4 is an enlarged view of B section in FIG. 3 and is an enlarged view of a proximity of a tip part of an optical fiber 13.

FIG. 4 is an enlarged view of B section in FIG. 3. As a method for making the tip of the optical fiber 13 protrude from the end face of the ferrule 3, there is a method in which the optical fiber 13 is fixed to the ferrule 3 first and then the end face of the ferrule 3 is polished. The resin-made ferrule 3 is preferentially polished so that only the glass-made optical fiber can protrude from the end face of the ferrule 3.

Here, the length F, which is a length of the optical fiber 13 that protrudes from the end face of the ferrule 3, is required to be fairly large. This is to avoid influence of glass fillers or the like that are included in the ferrule 3. However, as polishing amount of the ferrule 3 increases, polishing sagging at edge parts of the tip of the multi-core fiber 13 (substantially spherical shape) increases.

For a normal single-core fiber, polishing sagging to some extent at edge parts of the optical fiber has no great influence on its center core. However, for a multi-core fiber, when the tip part of the optical fiber has a spherical surface, the distance from the end face of the ferrule to the end face of the core may be different within an optical fiber, depending on the location of the core 19. If this difference in the distance increases, it would be difficult to optically connect all the cores 19 with certainty.

In the present invention, it is preferable that, for each of the optical fibers 13, the maximum difference in the distance from the end face of the ferrule 3 to the end face of each of the cores 19 of the multi-core fiber (G in the drawing) is 0.3 μm or less. This is because it would be difficult to bring the core 19 with the shortest distance from the end face of the ferrule 3 into contact with the connection target if the maximum difference is over 0.3 μm. A method for obtaining the protrusion amount F of the optical fiber 13 while suppressing polishing sagging at the tip edge parts of the optical fiber 13 will be described later.

Figure 5A:
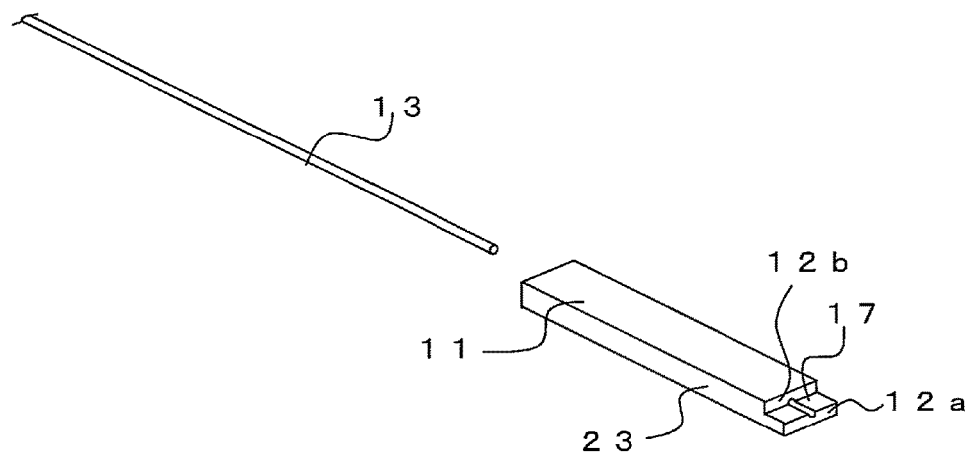
FIG. 5 (a) is a drawing showing a state before the optical fiber 13 is inserted into an optical fiber holding member 11.
Figure 5B:
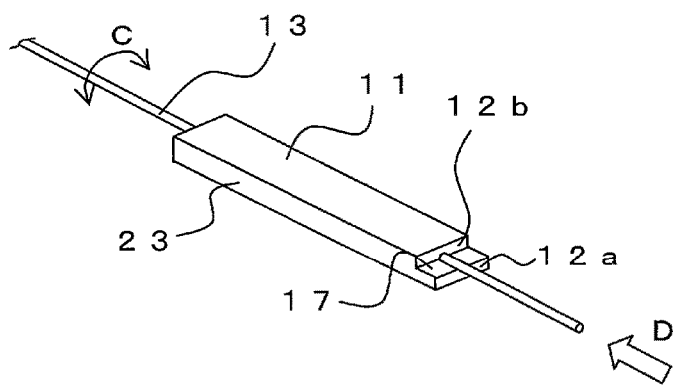

Next, the optical fiber holding member 11 will be described in detail. FIG. 5 (a) and FIG. 5 (b) are drawings to illustrate a process of fixing the optical fiber 13 to the optical fiber holding member 11. A level difference 17 is formed at a tip part of the optical fiber holding member 11 and thus a long surface 12a and a short surface 12b are formed. In addition, in the optical fiber holding member 11, a hole penetrating in its longitudinal direction is formed. The single optical fiber 13 is inserted into the single optical fiber holding member 11. The optical fiber 13 protrudes from the tip of the optical fiber holding member 11 for a predetermined length. A boundary line between the long surface 12a and the short surface 12b of the level difference 17 is formed as a straight line at a position so as to pass through the center of the hole (the optical fiber 13) when viewed from the tip part of the optical fiber holding member 11.

In addition, at least one of the side faces of the optical fiber holding member 11 is a flat portion 23. In the example shown in the drawings, since the optical fiber holding member 11 is in a substantially rectangular column shape and its cross section is substantially rectangular, flat portions are formed on the all four side faces. The flat portion 23 is a part that contacts a reference surface of the housing section 21 (an inner surface, for example) when the optical fiber holding member 11 is housed in the housing section 21 of the ferrule 3. By contacting the flat portion 23 with the inner surface of the housing section 21 in this way, it is possible to restrain the optical fiber holding member 11 from rotating inside the housing section 21. That is, the flat portion 23 acts as a rotation restraining part for the optical fiber holding member 11 inside the housing section 21. The rotation restraining part can restrain the rotation of the optical fiber holding member 11 inside the housing section 21 with the longitudinal direction of the optical fiber holding member 11 as an axis of rotation. The housing condition for the optical fiber holding member 11 in the housing section 21 will be described in detail later.

As shown in FIG. 5 (b), with the optical fiber 13 being inserted into the optical fiber holding member 11, the optical fiber 13 can be aligned to the optical fiber holding member 11 in the rotational direction by rotating the optical fiber 13.

Figure 6A:
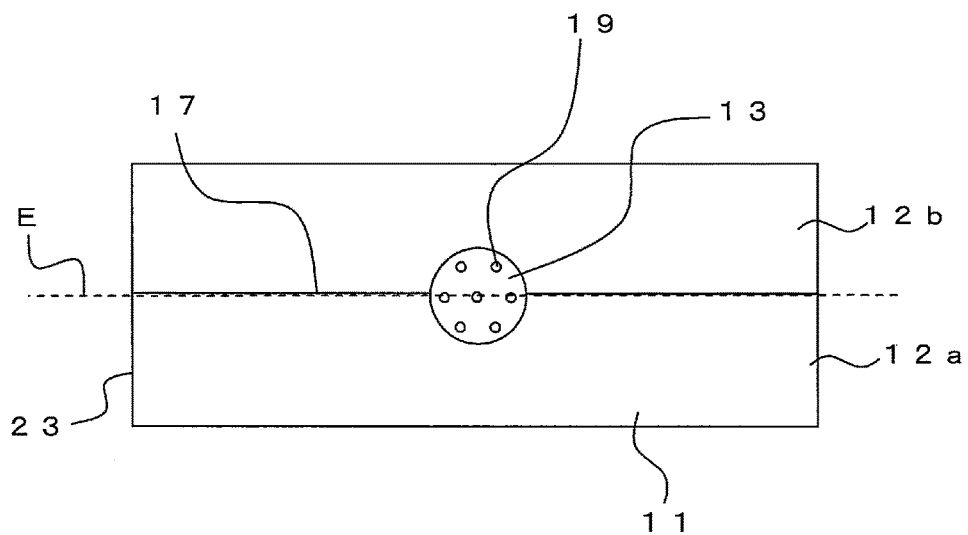
FIG. 6 (a) is a drawing showing the optical fiber holding member 11 viewed from its front at the time of alignment.
Figure 6B:
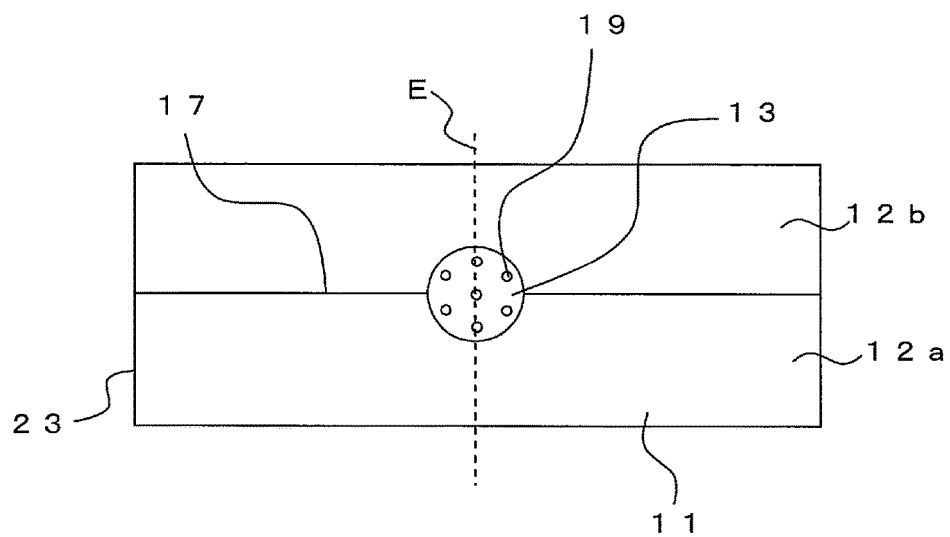

FIG. 6 (a) is a view taken in the direction of an arrow D in FIG. 5 (b) and is a front view of the optical fiber holding member 11. As shown in FIG. 6 (a), a magnified image of the front view of the optical fiber holding member 11 is displayed on a monitor. At this time, in the example shown in the drawings, when the above-mentioned flat portion 23 is taken as a reference part, the boundary line between the long surface 12a and the short surface 12b of the level difference 17 is formed perpendicular to the flat portion 23.

Here, the optical fiber 13 is a multi-core fiber including a plurality of the cores 19. In the example shown in the drawings, the center core and the six surrounding cores 19 are disposed at equal intervals. That is, the arrangement of the cores 19 has an orientation in a circumferential direction (the rotational direction) on a cross section taken in a direction perpendicular to the longitudinal direction. The arrangement of the cores 19 of the optical fiber 13 is not limited to the example shown in the drawings.

For example, let one of the centerlines of the optical fiber 13 on which three of the cores 19 are lined be the particular axis of symmetry E. At this time, the optical fiber 13 is rotated against the optical fiber holding member 11 (arrow C in FIG. 5 (b)) so that the axis of symmetry E coincides with the boundary line between the long surface 12a and the short surface 12b of the level difference 17. When the boundary line of the level difference 17 completely coincides with the axis of symmetry E on the monitor, the optical fiber 13 is fixed to the optical fiber holding member 11 using adhesive agent. Thus, alignment operation can be easily performed by the rotational alignment in which the level difference 17 and the axis of symmetry E coincide with each other.

Alternatively, the boundary line of the level difference 17 and the axis of symmetry E may be rotationally aligned so as to intersect with each other at right angles, instead of coinciding with each other, as shown in FIG. 6 (b). In this case, for example, a first cursor line corresponding to the level difference 17 and a second cursor line that is orthogonal to the first cursor line are displayed on the monitor, and with the line of the level difference 17 coinciding with the first cursor line, the rotational alignment is performed so that the second cursor line and the axis of symmetry E coincide with each other.

Also, the boundary line of the level difference 17 is not limited thereto and may be in any form as long as it can indicate the orientation of the optical fiber, which has an orientation in its rotational direction with its longitudinal direction as an axis of rotation on a cross section perpendicular to the longitudinal direction.

As above, since the boundary line of the level difference 17 can be taken as a reference line when viewed from the tip of the optical fiber holding member 11, the rotational alignment of the optical fiber 13 can be performed easily. That is, the boundary line of the level difference 17 functions as a mark indicating the orientation of the optical fiber 13. As such a mark, another structure such as a groove or a protrusion may be used instead of the level difference 17.

Figure 7:
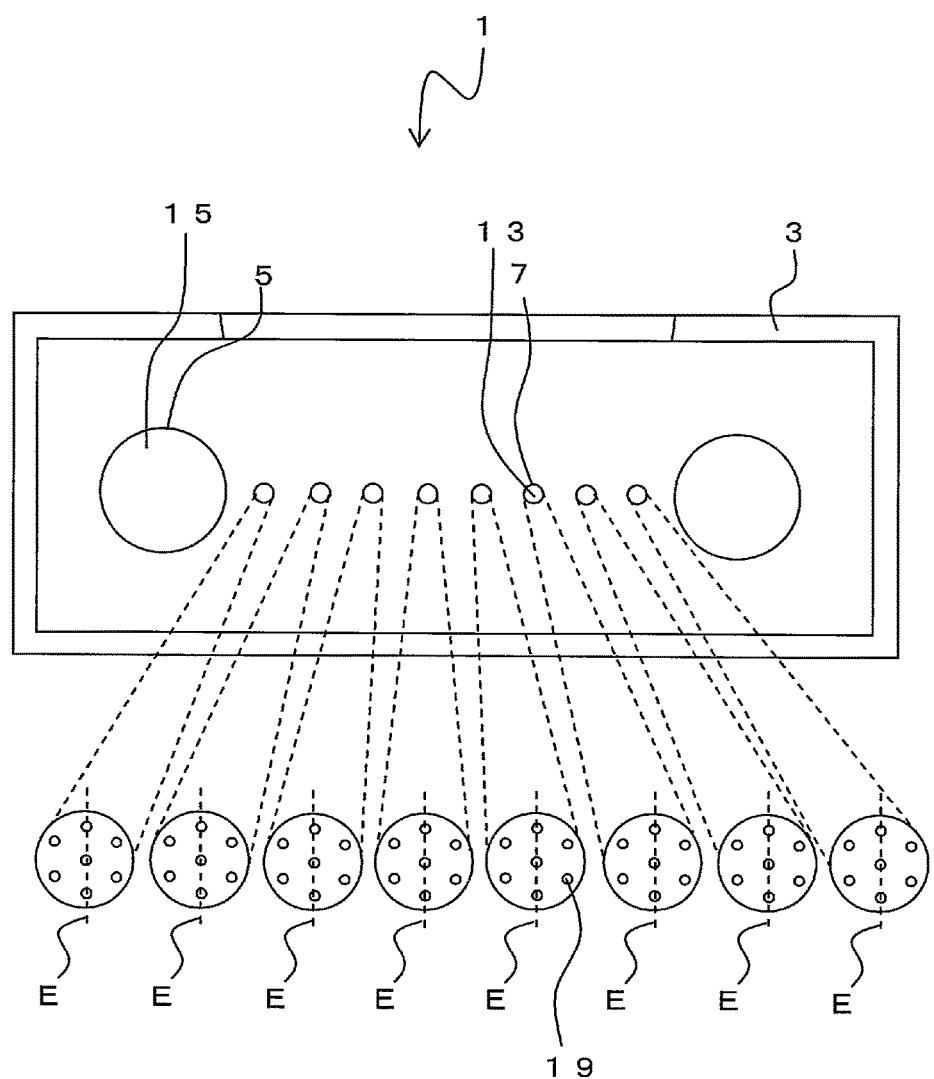
FIG. 7 is a front view of the multi-core connector 1.

FIG. 7 is a front view of the multi-core connector 1 and an enlarged view of the end faces of the optical fibers 13. As mentioned above, each of the optical fibers 13 is held by the optical fiber holding member 11 and is rotationally aligned so that the position in the rotational direction of the optical fiber 13 against the optical fiber holding member 11 is uniform. Thus, in the present invention, the optical fibers 13 can be disposed so that the every axis of symmetry E of the each optical fiber 13 exposing from the end face of the multi-core connector 1 is in the same direction.

Figure 8A:
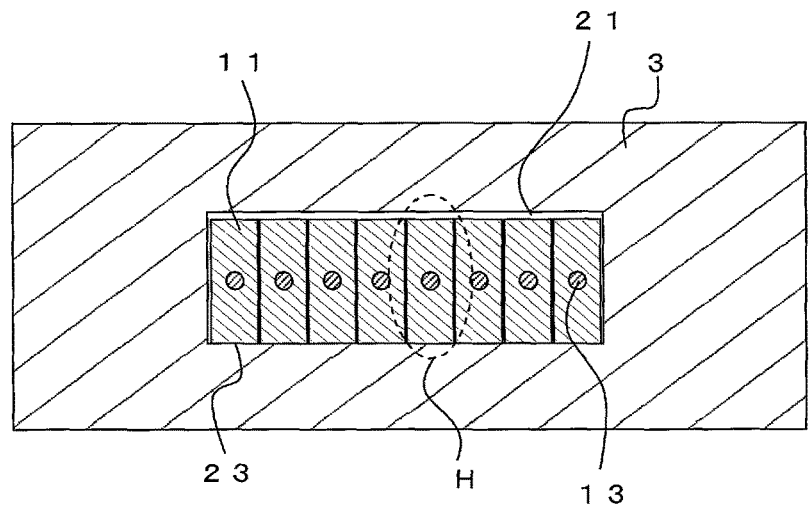
FIG. 8 (a) is a cross sectional view taken along the line A-A in FIG. 3.
Figure 8B:
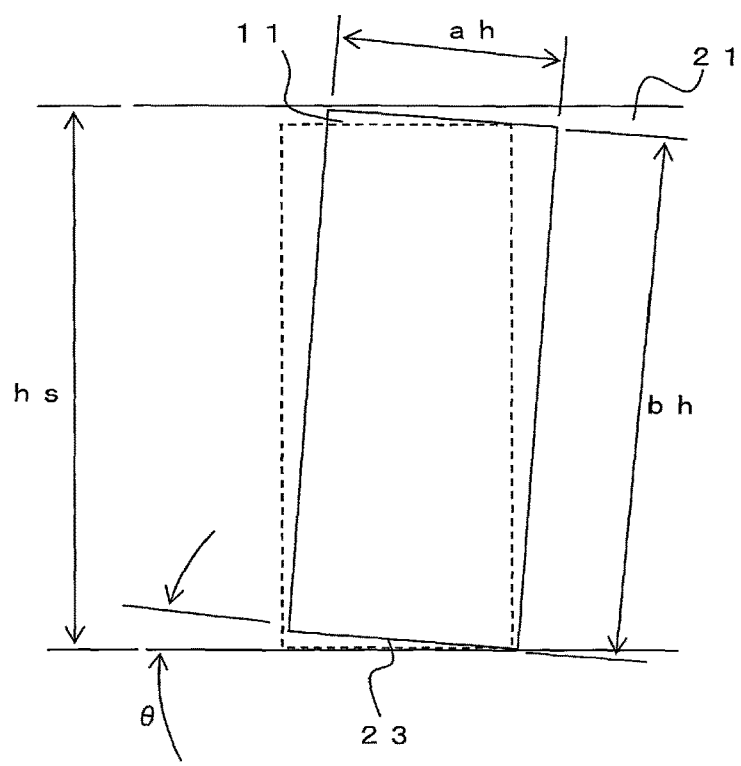

FIG. 8 (a) is a cross sectional view taken along the line A-A in FIG. 3. As mentioned above, the position of the optical fiber holding member 11 can be determined in its rotational direction by contacting the flat portion 23 of the optical fiber holding member 11 with an inner surface (a flat portion) of the housing section 21. Meanwhile, to make sure of insertion of the optical fiber holding member 11, the size of the housing section 21 is slightly larger than that of the optical fiber holding member 11. That is, a clearance is formed at a part between the optical fiber holding member 11 and the inner face of the housing section 21.

FIG. 8 (b) is an enlarged schematic view of H section extracted form FIG. 8 (a). The height of the housing section 21 is hs. Also, the width of the optical fiber holding member 11 is ah and the height thereof is bh (which is smaller than hs). When the flat portion 23 is in contact with the inner face of the housing section 21, it is unnecessary to consider the rotation of the optical fiber holding member 11. That is, the flat portion 23 of the optical fiber holding member 11 is in contact with the inner face of the housing section 21 and thus the rotation of the optical fiber holding member 11 against the housing section 21 is restrained. However, as mentioned above, a clearance is formed at a part between the optical fiber holding member 11 and the housing section 21. For this reason, the optical fiber holding member 11 is allowed to rotate slightly ($\theta$ in the drawing) inside the housing section 21.

When this angle of rotational allowance $\theta$ is increased, the rotation of the optical fiber holding member 11 inside the housing section 21 may cause to deviate the rotational alignment of the optical fiber 13 to the ferrule 3. Thus, it is preferable that the dimensions of each part are designed so that the angle of rotational allowance $\theta$ is 1 degree or less. Specifically, it is preferable that the dimensions of each part are designed so as to make the angle of rotational allowance $\theta$ 1 degree or less in a relation: $ah \cdot \sin \theta + bh \cdot \cos \theta = hs$. In this way, the rotation of the optical fiber holding member 11 can be suppressed to a minimum.

Next, a method for manufacturing the multi-core connector 1 will be described. First, as mentioned above, the optical fiber 13 is fixed to the optical fiber holding member 11. At this time, the optical fiber 13 is rotationally aligned so as to be in a predetermined rotational position against the reference face of the optical fiber holding member 11. If there are any defects in rotational alignment, only the subjected optical fiber holding member 11 is to be abolished.

Next, only the optical fiber holding members 11 that have been completed in rotational alignment at a desirable accuracy are inserted into the housing section 21 of the ferrule 3. In addition, the tips of the optical fibers 13 protruding from the tips of the optical fiber holding members 11 are inserted into the holes 7 on the ferrule 3 and are protruded from the end face of the ferrule 3.

Figure 9A:
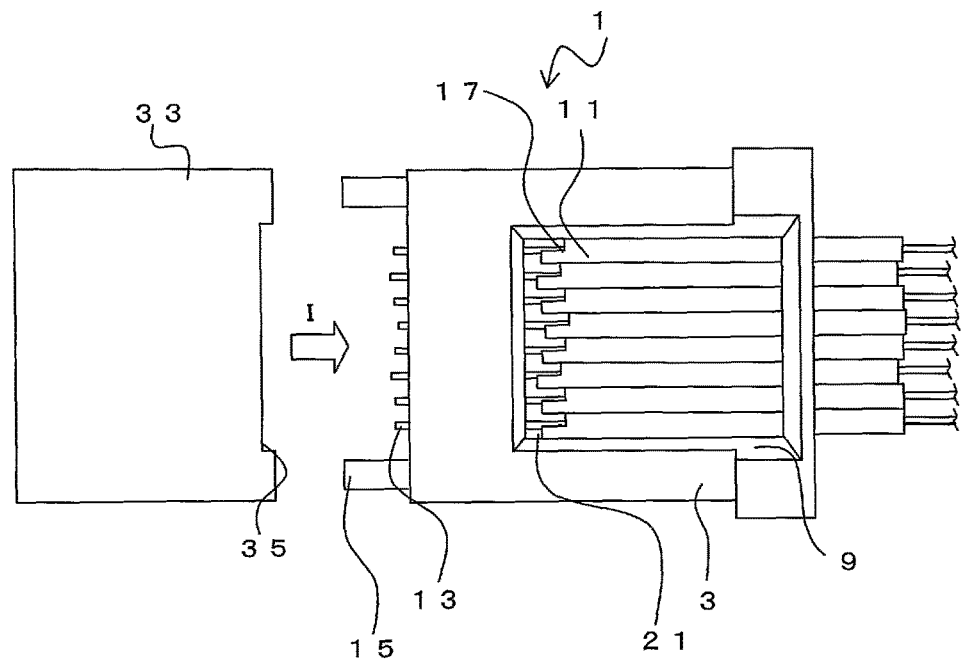
FIG. 9 (a) is a drawing showing an assembly process of the multi-core connector 1.
Figure 9B:
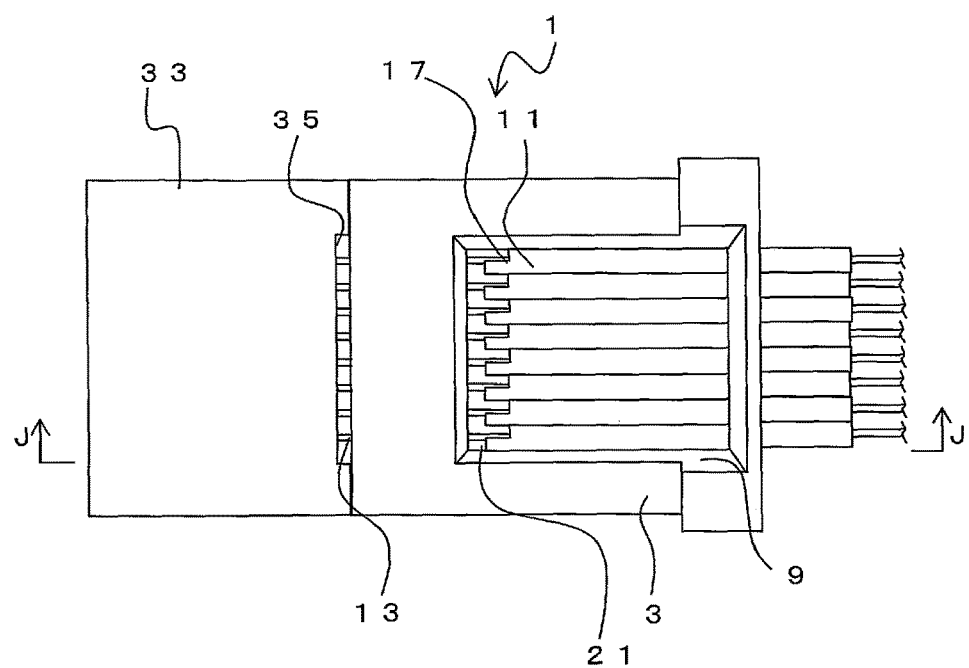

Next, as shown in FIG. 9 (a), a butting member 33 is disposed in a connection direction of the ferrule 3 (a protruding direction of the tips of the optical fibers 13) and butted to the ferrule 3 (an arrow I in the drawing). The butting member 33 is a member having guide holes that fit with the guide pins 15 and a recess portion 35 formed at a region in which the optical fibers 13 protrude, for example.

As shown in FIG. 9 (b), when the butting member 33 is butted against the ferrule 3, a clearance due to the recess portion 35 is formed between the end face of the ferrule 3 and the butting member 3. Here, the optical fiber holding members 11 are pushed toward the direction of the tip end of the ferrule 3 so that each of the tips of the each optical fiber 13 butts against the butting member 33. Thus, the tips of the optical fibers 13 can be protruded from the end face of the ferrule 3 for a predetermined amount of protrusion according to the recess portion 35.

Figure 10:
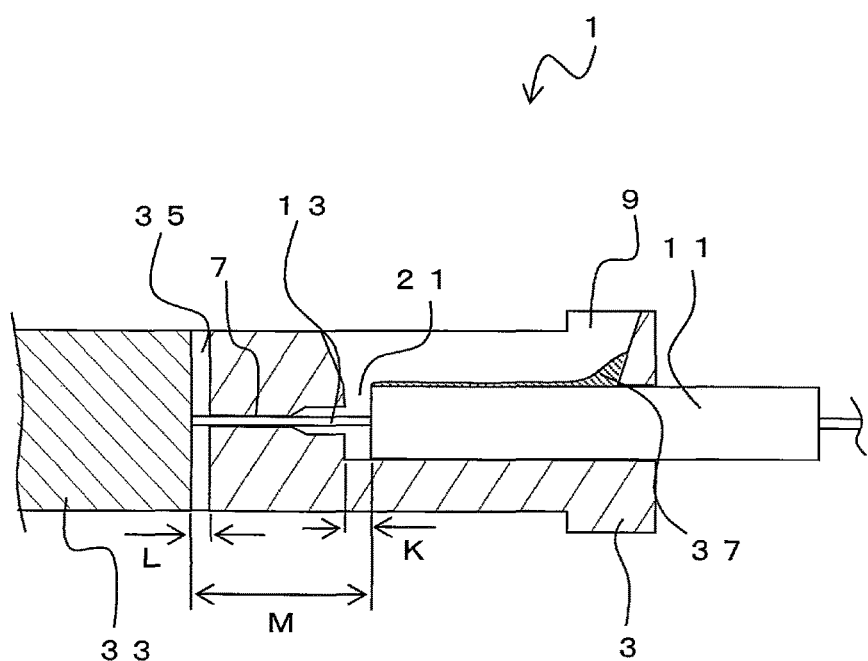
FIG. 10 is a cross sectional view taken along the line J-J in FIG. 9 (b).

FIG. 10 is a cross sectional view taken along the line J-J in FIG. 9 (b) in this state. The opening 9 is formed on the top face of the ferrule 3. Adhesive agent 37 can be applied from the opening 9. With the adhesive agent 37, the optical fiber holding members 11 can be fixed to the ferrule 3 (the housing section 21).

The inner face of the housing section 21 on the side on which the holes 7 are formed is not in contact with the end face of the optical fiber holding member 11 and a clearance (K in the drawing) is formed. This can prevent the holes 7 from being attached with the adhesive agent 37 dropping in the housing section 21. That is, in the present invention, it is preferred that the optical fibers 13 are not adhered to the ferrule 3 at the holes 7.

Here, to optically connect the optical fibers 13 with other optical fibers or the like, it is necessary to bring other optical fibers or the like into physical contact with the optical fibers 13. That is, it is necessary to push the end faces of the optical fibers 13 against the connection target with a predetermined pressing force. As mentioned above, although use of the butting member 33 substantially evens the amount of protrusion of each of the optical fibers 13, it is difficult to have a complete regularity and there is a slight variation in the amount of protrusion. When there is such a variation, it would be difficult to press the optical fibers 13 with relatively smaller amount of protrusion against the connection target.

To make sure that a plurality of the optical fibers 13 with the variation in the amount of protrusion are in physical contact with the connection target, the optical fibers 13 should be pressed against the connection target with a predetermined pressing force so as to elastically compress the optical fibers 13 with relatively larger amount of protrusion. In this way, the optical fibers 13 with relatively larger amount of protrusion are compressed to have smaller amount of protrusion, and thus the difference in the amount of protrusion from the other optical fibers 13 can be decreased.

Here, distortion aroused by the predetermined pressing force (stress) is given by (amount of change in length)/(original length). Thus, for the same distortion, the longer the original length is, the greater amount of change in length can be obtained.

If the optical fiber 13 is fixed to the hole 7 with the adhesive agent 37, the free part of the optical fiber 13 is limited to the length L, which is a length of protrusion from the end face of the ferrule 3. Thus, the original length of the optical fiber 13 that can be elastically compressed is equal to L.

On the other hand, if the optical fiber 13 and the hole 7 are not adhered to each other, the free part of the optical fiber 13 is a length M, which is a length of protrusion from the end face of the optical fiber holding member 11. Thus, the original length is longer compared to the case in which the optical fiber 13 is adhered to the hole 7, and thus the change in length obtained by the predetermined pressing force increases. That is, the variation in the amount of protrusion of the optical fibers 13 can be absorbed, if there is any. Thus, in the present invention, it is preferable that the optical fibers 13 are not adhered to the ferrule 3 at the holes 7.

As above, according to the present embodiment, the multi-core connector 1, which is an MT connector type, can be obtained. Also, although the optical fibers 13 need rotational alignment, the separate optical fiber holding member 11 is used for the each optical fiber 13 and thus the risk of faulty rotational alignment can be distributed to the respective optical fiber holding members 11. For this reason, compared to the case in which all the optical fibers 13 are directly fixed onto the ferrule 3, lowering of the yield rate of the connector due to faulty rotational alignment can be suppressed.

Also, the flat portion 23, which is a rotation restraining part, is provided on the optical fiber holding member 11. This restrains the optical fiber holding member 11 from rotating in the housing section 21 so that the positioning in the rotational direction can be determined easily.

Furthermore, by setting the internal dimensions of the housing section 21 and the dimensions of the optical fiber holding member 11 appropriately, the angle of rotational allowance of the optical fiber holding member 11 inside the housing section 21 can be 1 degree or less.

In addition, the level difference 17, which is a reference line used at the time of rotational alignment of the optical fiber 13, is formed on the optical fiber holding member 11. Thus, it is easy to coincide the rotational position of the optical fiber 13 with the reference line on the monitor.

In addition, use of the butting member 33 can easily make the tips of the optical fibers 13 protrude from the end face of the ferrule 3 for the predetermined amount. Thus, it is unnecessary to polish the end face of the ferrule 3. As a result, polishing sagging of the edge parts of the end face of the optical fiber 13 can be suppressed. Also, if the maximum difference in the distance from the end face of the ferrule 3 to the end face of each of the cores 19 of the multi-core fiber is 0.3 μm or less, all the cores 19 can be optically connected with the connection target with certainty. This will be described in detail later in <Connector and Connector Connection Structure> section.

Also, only the optical fiber holding member 11 is fixed to the ferrule 3 and the optical fiber 13 is not directly fixed to the ferrule 3 (the hole 7). Thus, a sufficient length of the optical fiber 13 for elastic compression transformation can be obtained. As a result, the variation in the amount of protrusion of the optical fibers 13 from the end face of the ferrule 3 can be absorbed, if there is any.

It is not always necessary to use the butting member 33 for protruding the optical fibers 13 from the ferrule 3 for a predetermined amount. Other methods can be adopted as long as the method can make the amount of protrusion of the optical fibers 13 uniform to a certain extent. In such a case, with the optical fibers 13 protruding from the ferrule 3 for a predetermined amount, the optical fiber holding members 11 may be fixed to the ferrule 3 and then the tips of the optical fibers 13 protruding from the ferrule 3 may be polished.

Figure 11A:
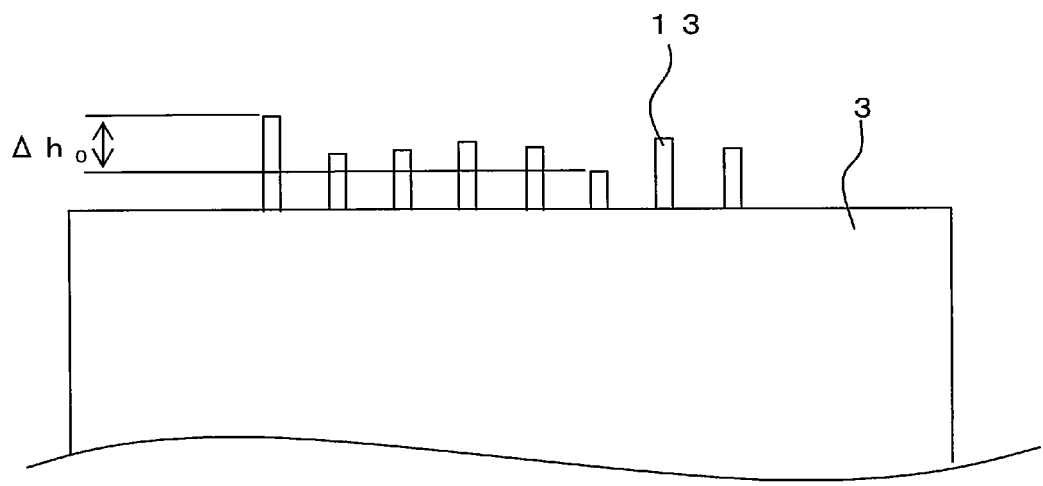
FIG. 11 (a) is a schematic view showing a state in which the optical fibers 13 protrude from a ferrule 3.
Figure 11B:
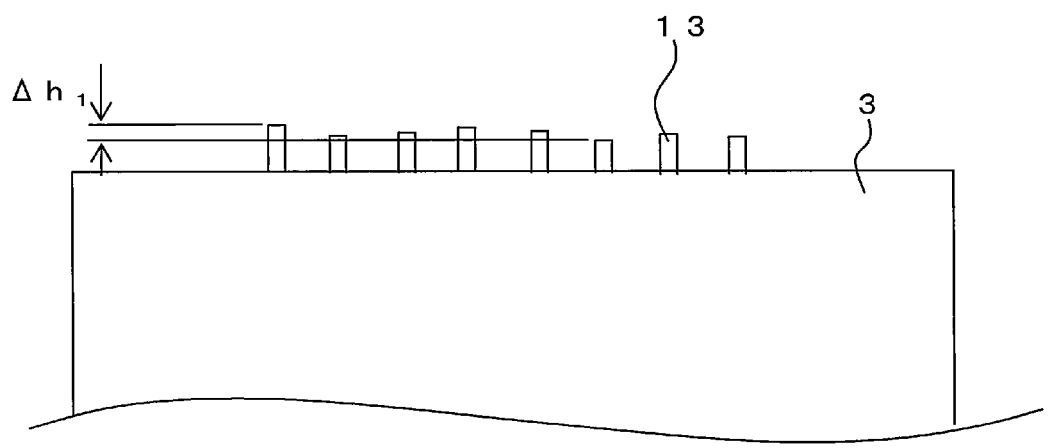

FIG. 11 (a) is a schematic view showing the state in which the optical fibers 13 protrude from the ferrule 3 before polishing the optical fibers 13, and FIG. 11 (b) is a schematic view showing the state in which the tips of the optical fibers 13 are polished. For example, immediately after the optical fiber holding member 11 is fixed to the ferrule 3, there is a variation of $\Delta h_0$ in the amount of protrusion of the optical fibers 13 from the ferrule 3. This variation ($\Delta h_1$) can be reduced by polishing the tips of the optical fibers 13.

As above, polishing the tips of the optical fibers 13 protruding form the end face of the ferrule 3 and reducing the amount of protrusion can reduce the variation in the amount of protrusion of the optical fibers 13. As a result, required pressing force to obtain the sufficient length of the optical fiber 13 for elastic transformation can be decreased.

Alternatively, the tips of the optical fibers 13 can be further polished after the butting member 33 is used to even the protrusion margin of the optical fibers 13 and the optical fiber holding members 11 are fixed to the ferrule 3. In this way, the variation in the protrusion amount produced even after using the butting member 33 can be reduced. In addition, this can remove scratches or chipping on the end face of the optical fiber 13 that have been produced when being butted against the butting member 33.

In addition, when each of the optical fibers 13 is brought into physical contact with a connection target, it is not preferable if the edge part of the end face of the optical fiber 13 remains in a complete form. Thus, some parts of the edge part are preferably removed by polishing or the like. For this reason, by polishing the tips of the optical fibers 13 even after the use of the butting member 33, the edge parts of the end face of the optical fibers 13 can be removed in the process of polishing, and thus a shape of the end face of the optical fiber preferable for physical contact can be obtained. Details in conditions and the like for physical contact of the optical fibers will be described later in <Connector and Connector Connection Structure> section.

As above, by uniformly arranging the cores 19 of the optical fiber 13, each of the cores 19 of the multi-core connector 1 can be optically connected with another optical connector or an optical element, which is to be optically connected with the multi-core connector 1, with certainty.

Figure 12A:
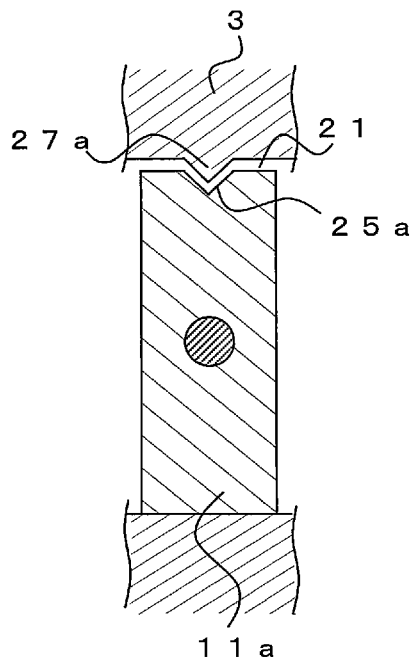
FIG. 12 (a) is a cross sectional view showing another embodiment of a rotation restraining part.
Figure 12B:
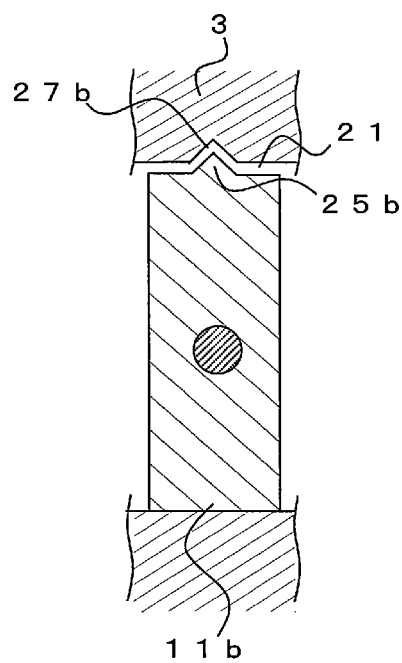
Figure 12C:
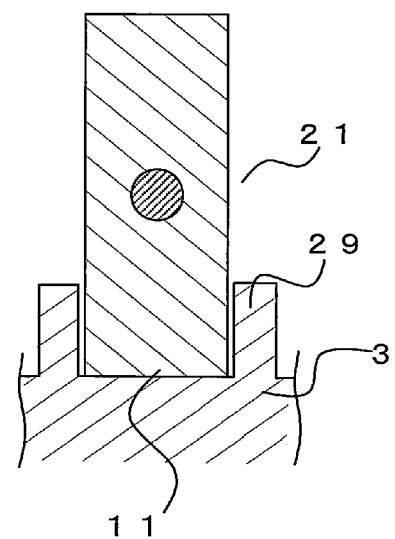

Next, other embodiments according to the present invention will be described. FIG. 12 (a) to FIG. 12 (c) are drawings to show other embodiments of the rotation restraining part. In the descriptions hereinafter, those structures having the same functions as the structures shown in FIG. 1 to FIG. 10 will have the same notations and redundant descriptions will be omitted. An optical fiber holding member 11a in FIG. 12 (a) has a recess portion 25a formed as a rotation restraining part. The recess portion 25a corresponds to a protruding portion 27a formed on an inner face of the housing section 21. The rotation of the optical fiber holding member 11a inside the housing section 21 is restrained by fitting the recess portion 25a and the protruding portion 27a together.

Similarly, an optical fiber holding member 11b in FIG. 12 (b) has a protruding portion 25b formed as a rotation restraining part. The protruding portion 25b corresponds to a recess portion 27b formed on an inner face of the housing section 21. The rotation of the optical fiber holding member 11b inside the housing section 21 can be restrained by fitting the protruding portion 25b into the recess portion 27b.

As above, the rotation of the optical fiber holding members 11a and 11b is restrained by the respective recess and protrusion portions. Thus, the respective recess and protrusion portions function as a restraining part. Thus, the optical fiber holding member 11a or 11b does not always need a flat portion for the contacting surface that contacts with the housing section 21 as shown in the drawings. Also, a clearance may be formed between the recess or protrusion portion of the optical fiber holding member 11a or 11b and the recess or protrusion portion of the housing section 21. In this case, the angle of rotational allowance of the optical fiber holding member 11a or 11b inside the housing section 21 should be 1 degree or less.

Alternatively, as shown in FIG. 12 (c), a guiding portion 29 may be formed on the housing section 21. Also, clearance may be formed between the optical fiber holding member 11 and the guiding portion 29. In this case, the angle of rotational allowance of the optical fiber holding member 11 inside the housing section 21 should also be 1 degree or less.

Figure 13:
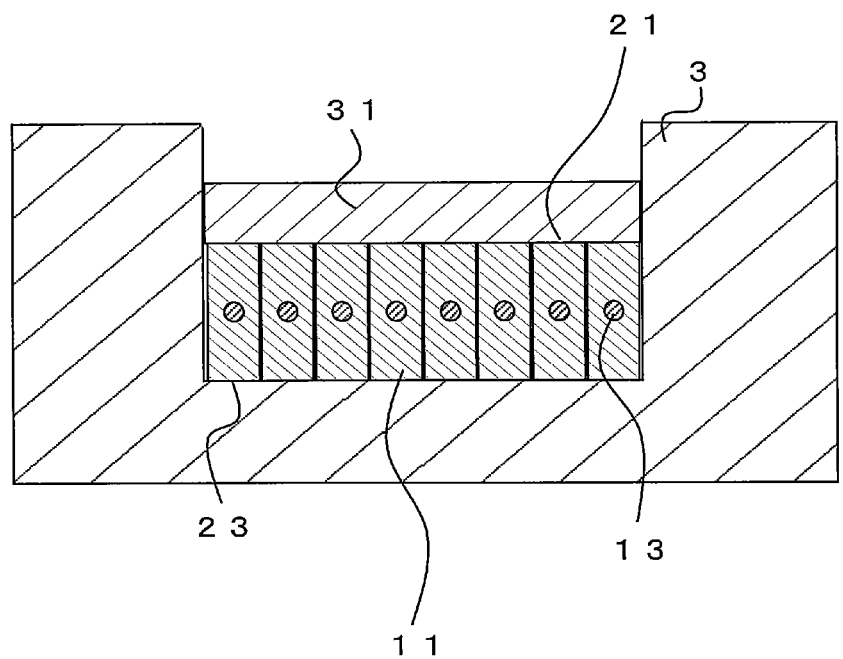
FIG. 13 is a cross sectional view showing another embodiment using a pressing member 31.

Alternatively, as shown in FIG. 13, a pressing member 31 may be used. The rotation of the optical fiber holding members 11 can be prevented with certainty by pressing down the optical fiber holding members 11 of which the rotation is already restrained by the flat portions 23. That is, preventing clearance from being formed between the optical fiber holding members 11 and the housing section 21 (a bottom surface of the pressing member 31) can prevent the rotation of the optical fiber holding members 11 inside the housing section 21.

Figure 14A:
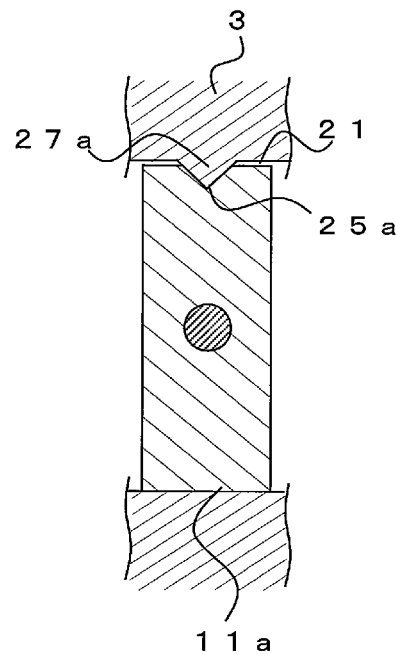
FIG. 14 (a) is a cross sectional view showing another embodiment of the rotation restraining part.
Figure 14B:
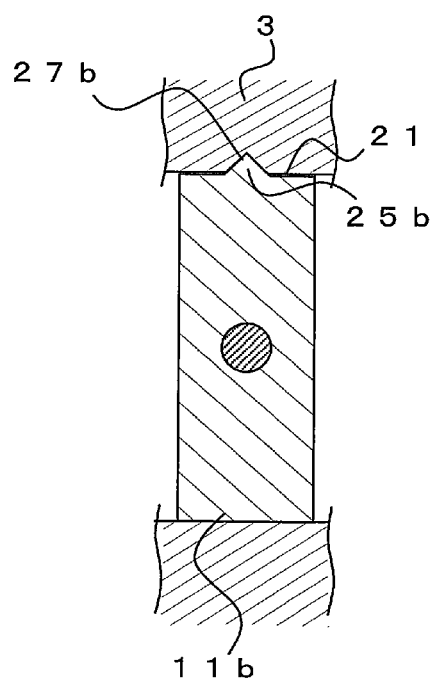
Figure 14C:
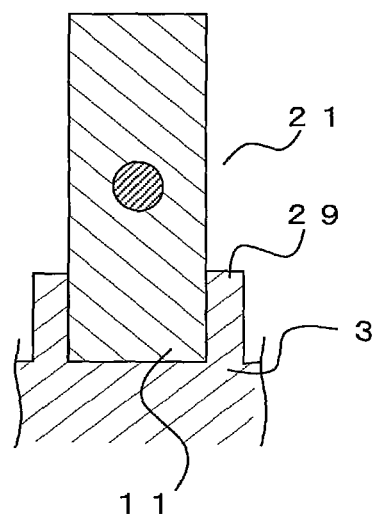

As a method for fixing the optical fiber holding members to the housing section 21 without clearance as above, the clearance between the recess portion 25a and the protrusion portion 27a of the above-mentioned optical fiber holding member 11a may be removed as shown in FIG. 14 (a). Similarly, as shown in FIG. 14 (b), the clearance between the protrusion portion 25b and the recess portion 27b of the above-mentioned optical fiber holding member 11b may be removed. Or, as shown in FIG. 14 (c), the clearance between the above-mentioned optical fiber holding member 11 and the guiding portion 29 may be removed. In these structures, the optical fiber holding members may be inserted into the housing section 21 by press fitting or the like.

Figure 15A:
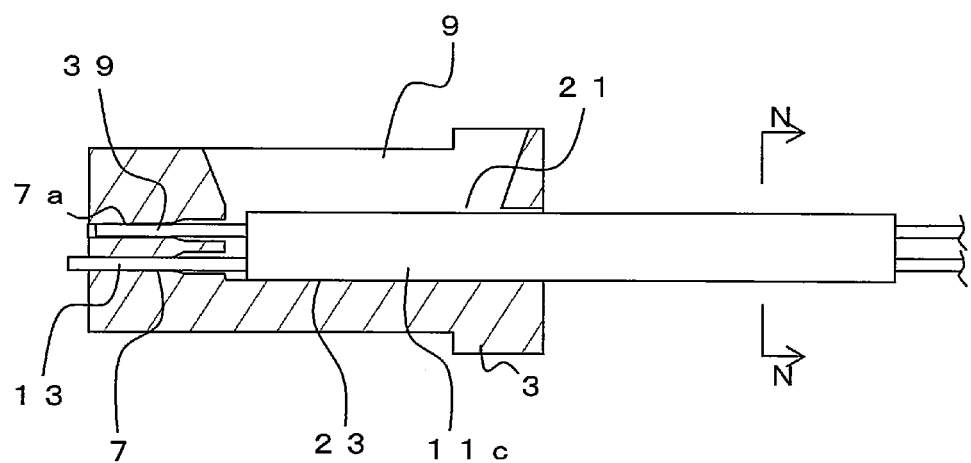
FIG. 15 (a) is a cross sectional view showing another embodiment of the rotation restraining part and a cross sectional view in a longitudinal direction.
Figure 15B:
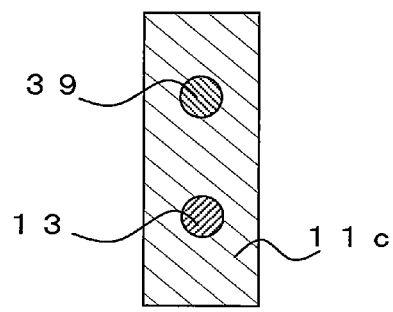

In addition, an optical fiber holding member 11c shown in FIG. 15 (a) may be used. FIG. 15 (a) is a cross sectional view taken along the longitudinal direction of the multi-core connector using the optical fiber holding member 11c and FIG. 15 (b) is a cross sectional view taken along the line N-N in FIG. 15 (a).

The optical fiber holding member 11c has a plurality of holes into which the optical fiber 13 and a dummy fiber 39 are inserted, respectively. The dummy fiber 39 protrudes from the end face of the optical fiber holding member 11c in the same direction as the optical fiber 13. Although the dummy fiber 39 is not used for transmitting light, a normal single-core fiber or a multi-core fiber may be used as the dummy fiber 39. Or, a dummy rod, instead of fiber, may also be used.

On the end face of the ferrule 3, the hole 7 into which the optical fiber 13 is inserted and a hole 7a into which the dummy fiber 39 is inserted are provided. It is not necessary for the dummy fiber 39 to protrude from the end face of the ferrule 3. Also, the hole 7a does not have to be a penetrating hole.

With the optical fiber holding member 11c used as above, the optical fiber 13 is inserted into the hole 7 and the dummy fiber 39 is inserted into the hole 7a so that the rotation of the optical fiber holding member 11c inside the housing section 21 can be restrained. The rotation of the optical fiber holding member 11c is restrained by the dummy fiber 39. That is, the dummy fiber 39 functions as a rotation restraining part. Thus, the optical fiber holding member 11c does not always need a flat portion on the contacting surface that contacts with the housing section 21 as shown in the drawing.

Also, although the above-mentioned embodiments show the examples in which the single optical fiber holding member holds the single optical fiber 13, the single optical fiber holding member may hold two or more optical fibers 13.

Figure 16:
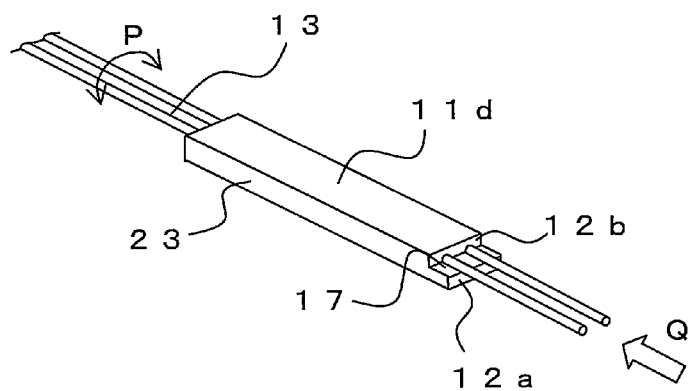
FIG. 16 is a drawing showing a state in which the optical fibers 13 are inserted into an optical fiber holding member 11d.

FIG. 16 is a drawing showing a state in which the single optical fiber holding member 11d holds the two optical fibers 13. The optical fiber holding member 11d has a pair of holes provided and each of the holes holds the optical fiber 13. As mentioned above, with the optical fibers 13 inserted into the optical fiber holding member 11d, the optical fibers 13 are rotated so that the optical fibers 13 can be aligned in the rotational direction thereof against the optical fiber holding member 11d (an arrow P in the drawing).

Figure 17:
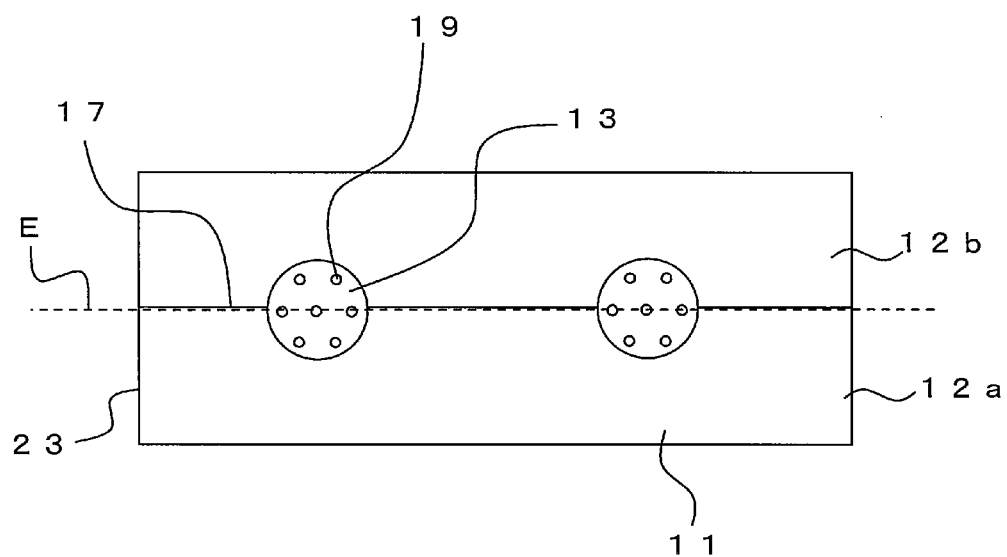
FIG. 17 is a view taken in the direction of an arrow Q in FIG. 16.

FIG. 17 is a view taken in the direction of an arrow Q in FIG. 16 and is a front view of the optical fiber holding member 11d. As mentioned above, with the optical fibers 13 inserted into the optical fiber holding member 11d, the magnified image of the optical fiber holding member 11d viewed from the front is displayed on the monitor.

At this time, a particular axis of symmetry E is chosen out of the centerlines of each of the optical fibers 13. The optical fibers 13 are rotated against the optical fiber holding member 11d so that each axis of symmetry E coincides with the boundary line of the level difference 17. When the boundary line of the level difference 17 and the axis of symmetry E completely coincide with each other on the monitor, each of the optical fibers 13 is fixed to the optical fiber holding member 11d using adhesive agent. The rotational alignment is performed in such a manner that the each axis of symmetry E coincides with the boundary line of the level difference as a reference line in this way so that the two optical fibers 13 have the same orientation.

Figure 18:
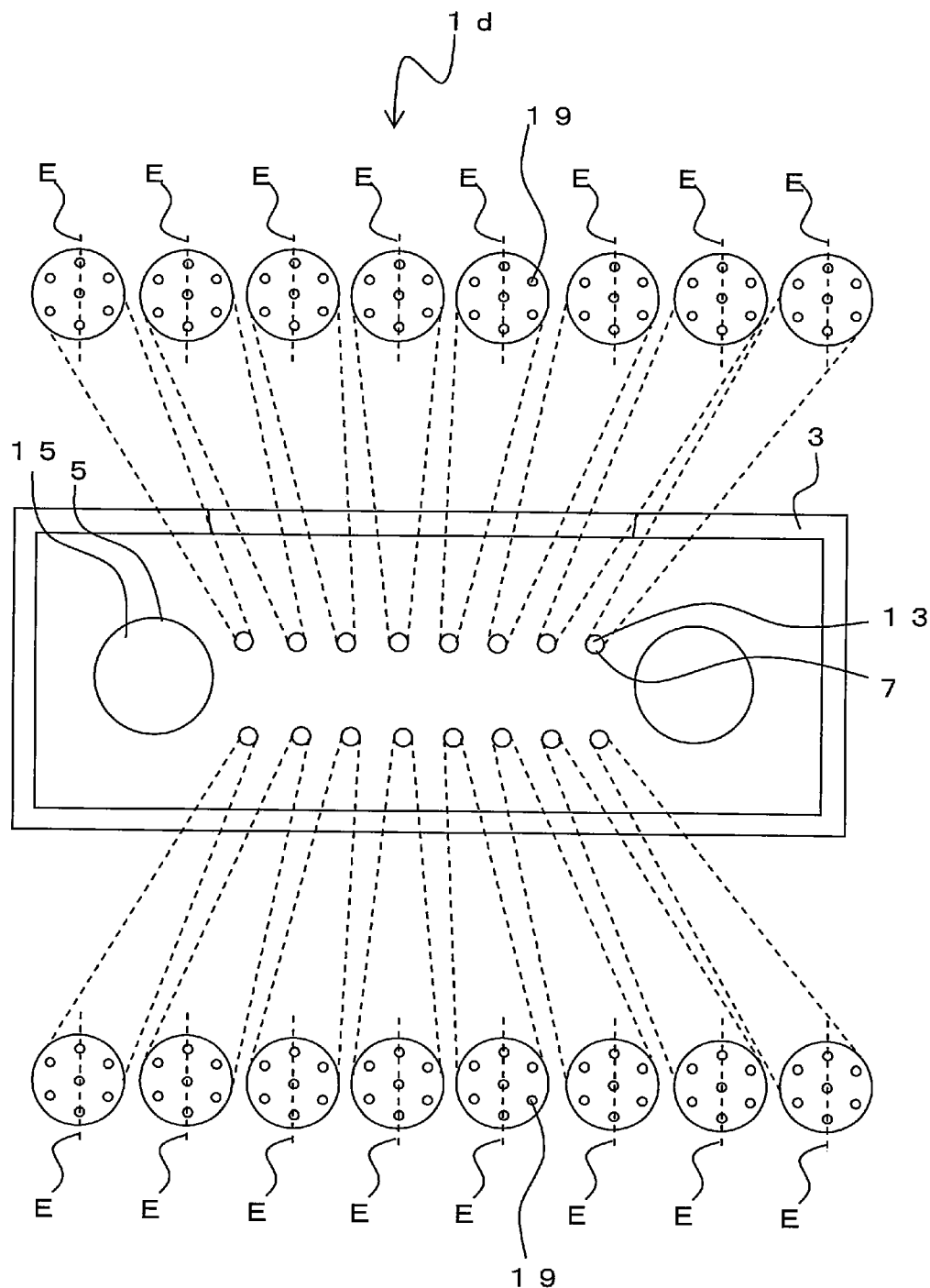
FIG. 18 is a front view of a multi-core connector 1d.

FIG. 18 is a front view of a multi-core connector 1d and an enlarged view of the end faces of the optical fibers 13. As mentioned above, the two optical fibers 13 are held by the optical fiber holding member 11d and, furthermore, a plurality of the optical fiber holding members 11d are fixed so that the position in the rotational direction of each of the optical fiber holding members 11d is uniform. Thus, in the present embodiment, the every axis of symmetry E of the optical fiber 13 exposed from the end face of the multi-core connector 1d can be all arranged in one direction.

Also, letting the two optical fibers 13 be held by the single optical fiber holding member 11d in this way determines the position of a pair of the optical fibers 13 at the upper and lower holes 7. This enables the two optical fibers 13 to function as a rotation restraining part that restrains the rotation of the optical fiber holding member 11d inside the housing section 21 of the ferrule 3.

As above, in the present invention, the number of the optical fibers 13 held by one optical fiber holding member may be one or more.

Figure 19A:
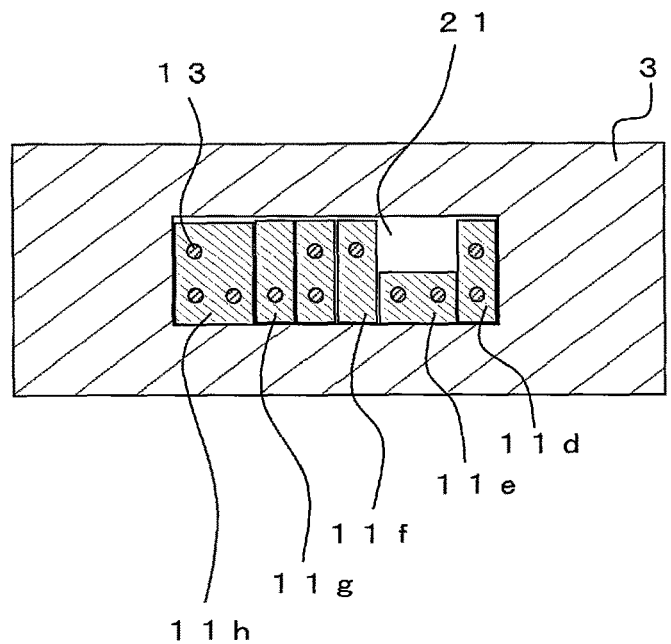
FIG. 19 (a) is a cross sectional view showing another embodiment.
Figure 19B:
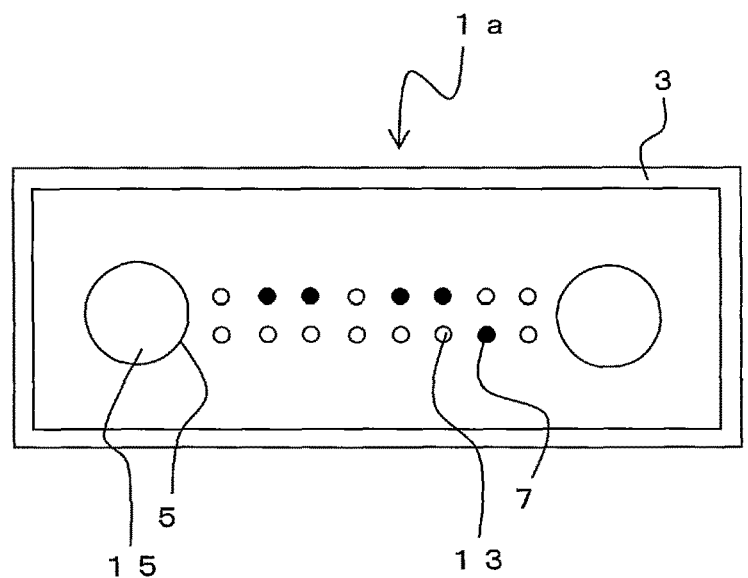

Also, in the present invention, as shown in FIG. 19 (a), a plurality of forms of optical fiber holding members can be used together. For example, the optical fiber holding member 11d holds a plurality of the optical fibers 13 in a vertical direction as mentioned above. Also, an optical fiber holding member 11e holds a plurality of the optical fibers 13 (two in the drawing) in the width direction. This enables the optical fiber holding members 11d and 11e function as a rotation restraining part for the two optical fibers 13.

Also, an optical fiber holding member 11f holds the one optical fiber 13, but its holding position is shifted upward. Similarly, an optical fiber holding member 11g holds the one optical fiber 13, but its holding position is shifted downward.

Also, the optical fiber holding member 11h holds a plurality of the optical fibers 13 that are provided side by side in the vertical and width direction, respectively. Thus, in the present invention, the number of the optical fibers 13 held by one optical fiber holding member may be one or more, and the arrangement thereof is not limited. It is also possible to combine a plurality of types of the optical fiber holding member together.

FIG. 19 (b) is a front view of a multi-connector 1a configured as in FIG. 19 (a). In the drawing, the hole 7 through which the optical fiber 13 is inserted is represented in white and an empty hole (the hole 7 through which the optical fiber 13 is not inserted) is represented in black. It is possible to arrange the positions of the optical fibers 13 arbitrarily by combining a plurality of types of the optical fiber holding members in this way.

For the ferrule 3, it is unnecessary to form the hole 7 at a part through which the optical fiber 13 is not inserted. However, as shown in the drawing, by disposing a plurality of the holes 7 at a predetermined pitch on the ferrule 3, the single ferrule 3 can be applied to a plurality of arrangements of the optical fibers 13. In this case, the unused hole 7 can be left as a vacancy.

As above, the optical fiber holding members according to the present invention can be applied to a variety of types of holding forms of the optical fibers 13 and can also be combined together to provide a multi-core connector.

Also, although an example in the embodiments mentioned above is applied to an MT connector that can determine the positioning with a connection target using a pair of the guide holes 5 (the guide pins 15), the present invention is not limited thereto. Other structures may be used as long as the positioning to the connection target is possible.

Figure 20A:
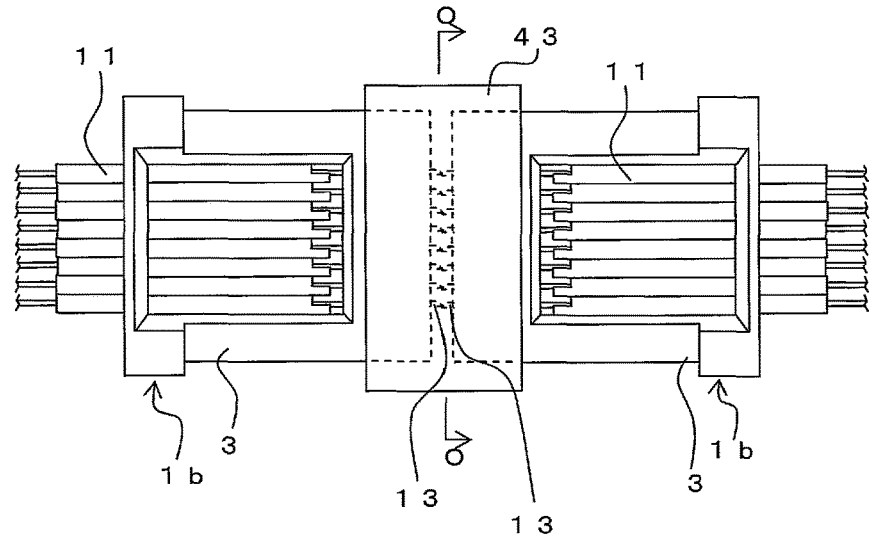
FIG. 20 (a) is a drawing showing another embodiment and showing a state in which multi-core connectors 1b are connected with each other.
Figure 20B:
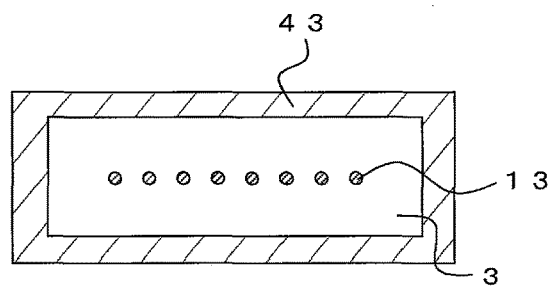
Figure 20C:
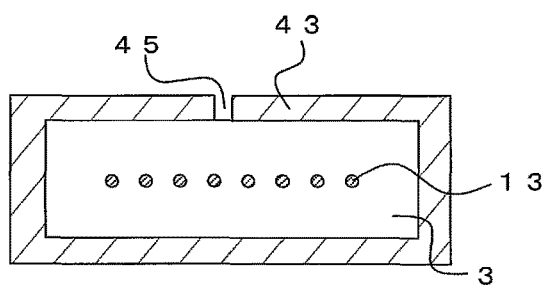

FIG. 20 (a) is a drawing showing a connection structure in which a pair of multi-core connectors 1b are connected by a ferrule aligning member 43. FIG. 20 (b) is a cross sectional view taken along the line O-O in FIG. 20 (a). The multi-core connector 1b does not include the guide holes 5. Thus, the guide pins 15 are not used for connecting the multi-core connectors 1b together.

The ferrule aligning member 43 is substantially a rectangular tube and ends of the ferrules 3 can be inserted from both sides thereof. The inner dimensions of the ferrule aligning member 43 are approximately equal to the outer dimensions of the ferrule 3 and thus the ferrule 3 is positioned by the ferrule aligning member 43. That is, the optical fibers 13 are positioned. Thus, the corresponding optical fibers 13 of each of the multi-core connectors 1b are positioned. As mentioned above, the cores 19 are always in a fixed arrangement in the each optical fiber 13, and thus, similarly as in the multi-core connector 1 or the like, the cores 19 are optically connected to each other in the multi-core connectors 1b.

As shown in FIG. 20 (c), providing a slit 45 at a part of the ferrule aligning member 43 to let the ferrule aligning member 43 have a split structure improves the insertion of the ferrule 3 and also to determine the position of the ferrule 3. Thus, the multi-core connectors according to the present invention do not always need the guide holes 5 or the guide pins 15.

Figure 21A:
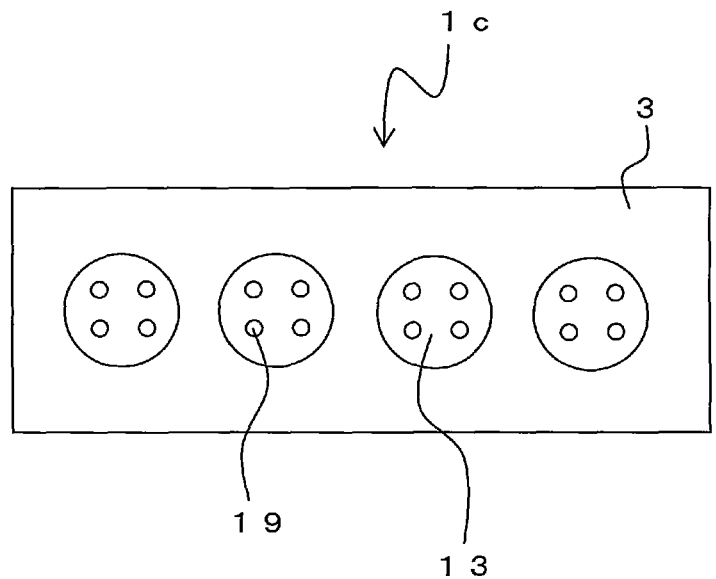
FIG. 21 (a) is a drawing showing another embodiment and is a schematic view of a multi-core connector 1c.
Figure 21B:
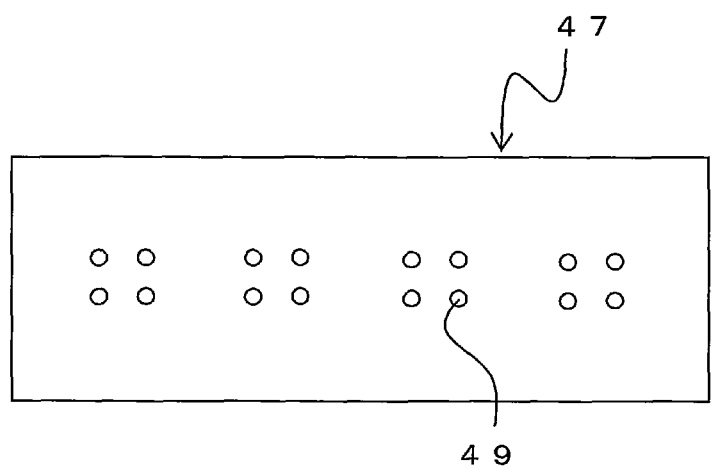

Also, the multi-core connectors according to the present invention are not limited to the connections between connectors. FIG. 21 (a) is a schematic view of a multi-core connector 1c and FIG. 21 (b) is a schematic view of a light emitting/receiving element array 47 that is to be optically connected with the multi-core connector 1c.

The light emitting/receiving element array 47 includes a plurality of light emitting/receiving parts 49. The light emitting/receiving part 49 is a part that receives or emits light. Also, the multi-core connector 1c, which is to be connected with the light emitting/receiving element array 47, includes the cores 19 of each of the optical fibers 13 disposed at the positions corresponding to the positions of the light emitting/receiving parts 49 of the light emitting/receiving element array 47. Thus, the cores 19 of the multi-core connector 1c can be optically connected with the light emitting/receiving parts 49 of the light emitting/receiving element array 47, respectively.

The multi-core connector 1c (the multi-core fibers) and the light emitting/receiving element array 47 (the light emitting/receiving parts 49) are aligned by active alignment, for example, and are fixed with adhesive agent. Also, a positioning mechanism for the multi-core connector 1c and the light emitting/receiving element array 47, whose illustration is omitted, may also be used.

Also, an optical fiber subjected in the present invention is not limited to a multi-core fiber. The present invention can be applied to any optical fiber that has a particular axis of symmetry on a cross section perpendicular to its longitudinal direction and has an orientation in a rotation direction with the longitudinal direction as an axis of rotation. That is, the present invention is applicable to optical fibers to which rotation alignment is performed.

Figure 22A:
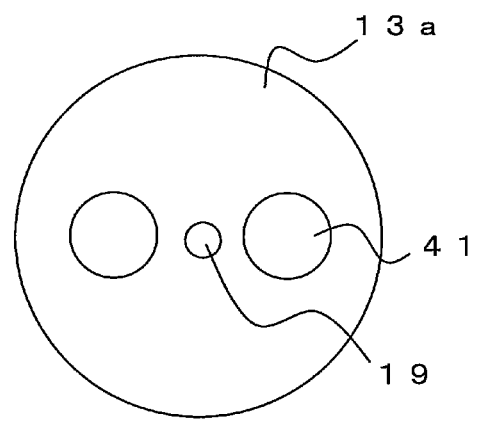
Figure 22B:
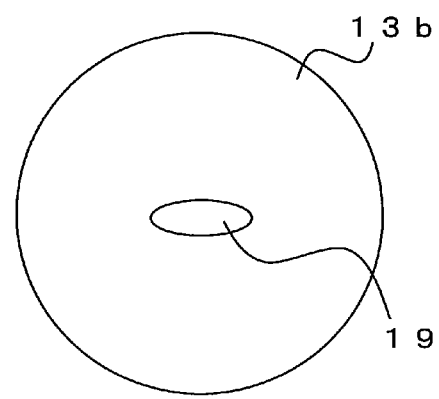

For example, the present invention can be applied to an optical fiber 13a shown in FIG. 22 (a). The optical fiber 13a has the core 19 at the center and stress applying parts 41 provided on both sides of the core 19. That is, the optical fiber 13a is a so-called polarization-maintaining fiber. The present invention can also provide the above-mentioned various effects for an optical fiber such as the optical fiber 13a by using the optical fiber holding members.

Also, the present invention can be applied to an optical fiber 13b shown in FIG. 22 (b). The optical fiber 13b has the core 19 at the center, but the core 19 is elliptical. The present invention can also provide the above-mentioned various effects for an optical fiber such as the optical fiber 13b by using the optical fiber holding members.

Also, the present invention can be applied to an eccentric core fiber. For example, it is applicable to an optical fiber having the single core 19, in which the core 19 is disposed at a position that is eccentric from the center. Even in this case, it is possible to regulate the direction of eccentricity of each optical fiber in the multi-core connector.

The multi-core connector according to the present invention can also be used for a connection with a PLC (Planar Lightwave Circuit) element, which is made of optical fibers and silica glass.

<Connector and Connector Connection Structure>

Figure 23:
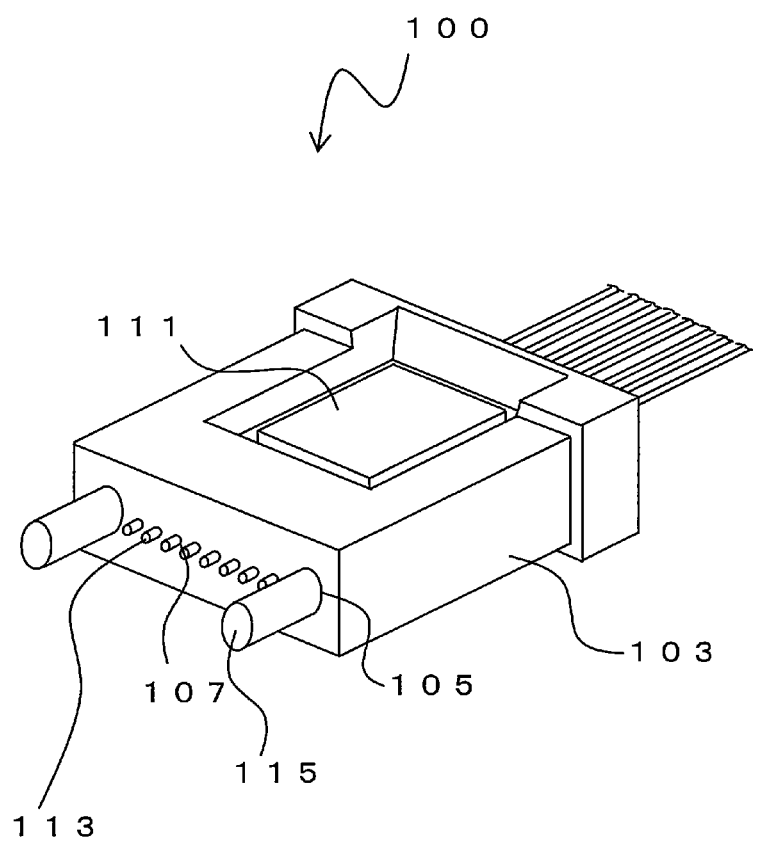
FIG. 23 is a perspective view showing a multi-core connector 100.
Figure 24:
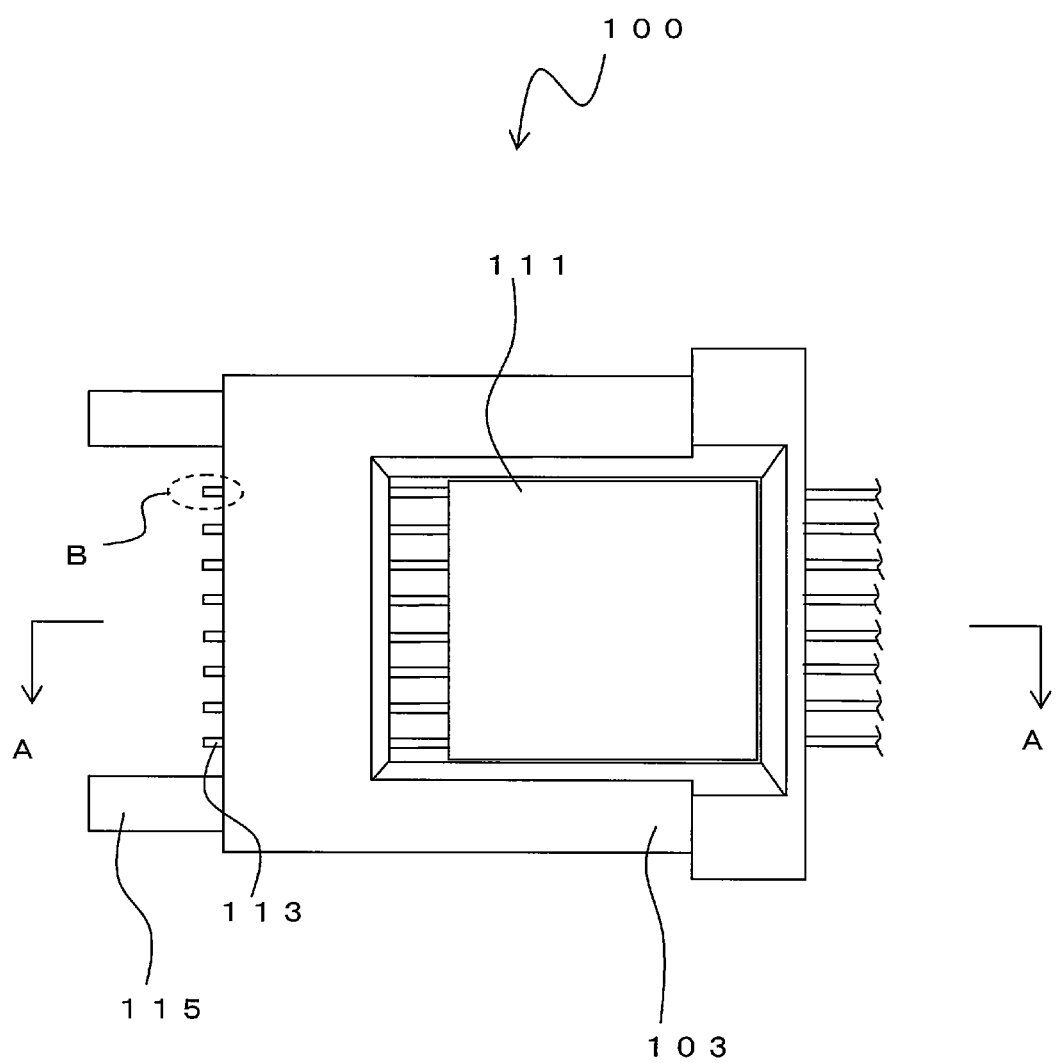
FIG. 24 is a plan view showing the multi-core connector 100.
Figure 25:
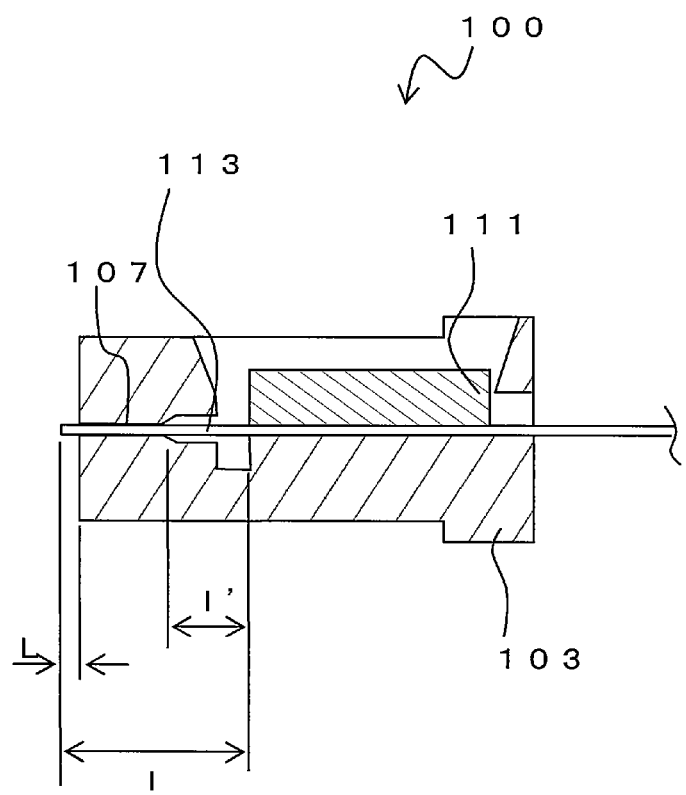
FIG. 25 is a cross sectional view of the multi-core connector 100 and is a cross sectional view taken along the line A-A in FIG. 24.

Next, a connector according to an embodiment of the present invention will be described. FIG. 23 is a perspective view of a multi-core connector 100, FIG. 24 is a plan view, and FIG. 25 is a cross sectional view taken along the line A-A in FIG. 24. The multi-core connector 100 includes mainly a ferrule 103, multi-core fibers 113, and so on.

A plurality of holes 107 are formed on the ferrule 103. The hole 107 is a part through which a tip of the multi-core fiber 113 is inserted to be held. The tip of the multi-core fiber 113 protrudes from an end face of the ferrule 103 for a predetermined length. Also, guide holes 105, which are the guiding mechanisms, are formed on both sides of a plurality of the holes 107 on the end face of the ferrule 103. Guide pins 115 are inserted into the guide holes 105. The guide pins 115 determine the position against a connection target such as a connector.

Providing the guide pins 115 or the guide holes 105 on both sides of the multi-core fibers 113 in this way allows the connector to be used as a so-called MT connector as mentioned above. Although the descriptions hereinafter show examples in which the connector of the present invention is applied as a multi-core connector of an MT type, the present invention is not limited thereto.

As shown in FIG. 25, the multi-core fiber 113 is not fixed to the hole 107 of the ferrule 103 and is fixed by a fixing part 111 to the ferrule 103. That is, the multi-core fiber 113 is fixed to the ferrule 103 in the rear of the hole 107 (on the other side of the tip of the multi-core fiber 113). Thus, the multi-core fiber 113 between the fixed position by the fixing part 111 to the tips thereof (length l in the drawing) is not fixed to the ferrule 103 and can be elastically deformed in a longitudinal direction of the multi-core fiber 113.

As mentioned above, if the multi-core fiber 113 is fixed to the hole 107, the multi-core fiber 113 is free in the longitudinal direction only within the limited length L of the protrusion from the end face of the ferrule 103. Thus, the elastic transformable length of the multi-core fiber 113 that can be elastically compressed is equal to the length L.

On the other hand, if the multi-core fiber 113 and the hole 107 are not adhered to each other, the multi-core fiber 113 is free for the length l, which is a length of protrusion from the end face of the fixing part 111. As above, since the elastic transformable length is longer compared to the case in which the multi-core fiber 113 is adhered to the hole 107, amount of change in the length produced by a predetermined pressing force is increased. That is, a variation in protrusion height of the multi-core fiber 113, if there is any, can be absorbed.

When the multi-core fiber 113 is pressed from the tip end, the multi-core fiber 113 may not only be elastically compressed and distorted but may be buckled. Here, a buckling load Fb that creates buckling is given by the following formula:

$$Fb=(\pi^3 \cdot E \cdot d^4)/(16 \cdot l'^2)$$

wherein E represents Young's modulus of the multi-core fiber, d represents a cladding diameter of the multi-core fiber, and l' represents a buckling length which is a length from the rear end of the hole 107 to the fixing part 111.

Here, the maximum load supposed per one multi-core fiber is 4N. With a safety factor, let the buckling load be 6N so that the buckling can be prevented if $$Fb \geq 6N$$

is satisfied.

Thus, when a multi-core fiber made of silica glass with E≈71.5 GPa is used, the above formula is expressed as:

$$l' \leq 151.96 \ d^2 \text{ (mm)}.$$

Thus, when the cladding diameter is 125 μm, l' should be 2.37 mm or less, and when the cladding diameter is 180 μm, l' should be 4.92 mm or less.

Figure 26A:
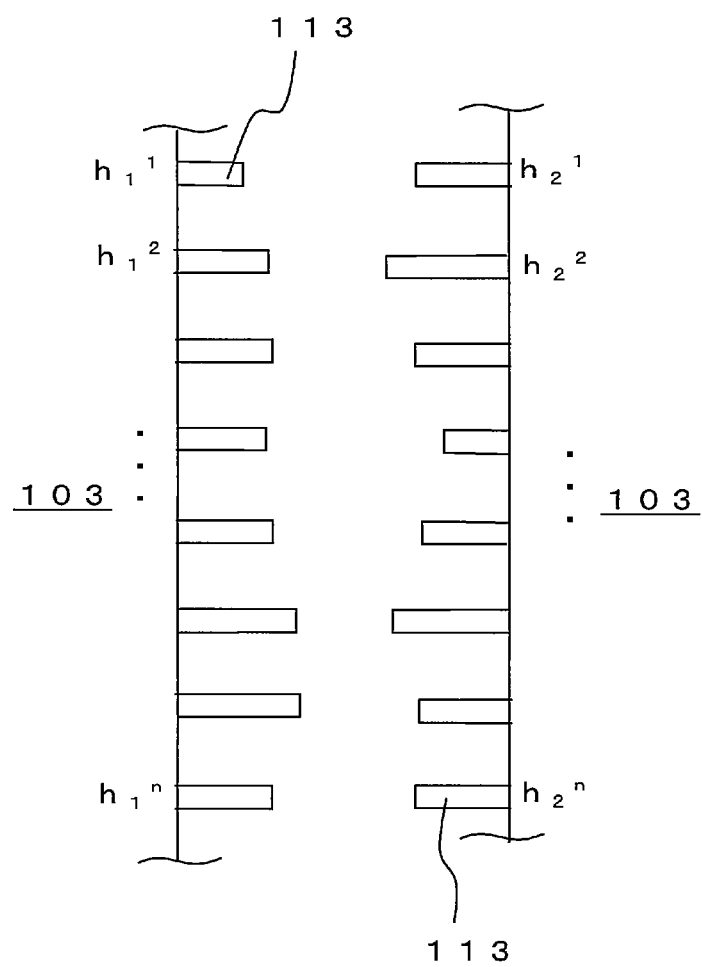
FIG. 26 (a) is a drawing showing a state in which multi-core fibers 113 are facing toward each other.
Figure 26B:
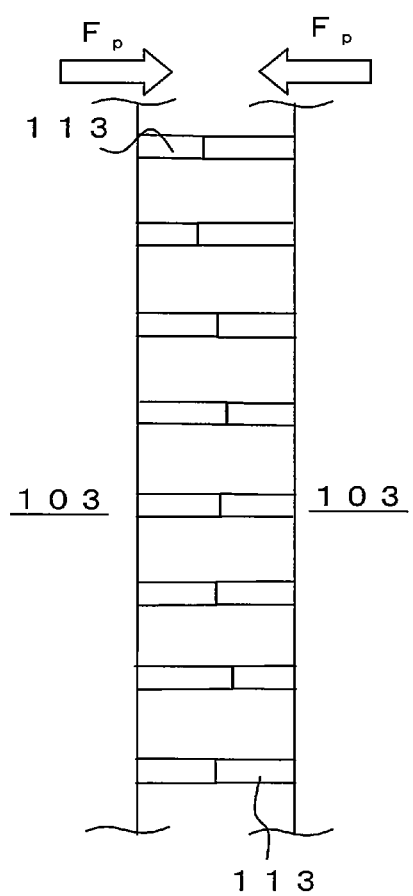

Next, a connection structure of the multi-core connectors 100 will be described. First, the variations in the protrusion margin of the multi-core fibers 113 from the ferrule 103 will be considered. FIG. 26 (a) is a drawing illustrating the multi-core fibers 113 of each of the multi-core connectors 100 facing each other. As mentioned above, the tips of the multi-core fibers 113 protrude from the end face of the ferrule 103 for the predetermined length.

Here, the protrusion height of each of the multi-core fibers 113 (L in FIG. 25) is represented by $h_i^j$, wherein i indicates the multi-core connector: the connector on the left in the drawing has i=1 and the connector on the right in the drawing has i=2. Also, j represents an ID of the multi-core fiber and j=1, 2, ..., n in order from the top in the drawing.

As shown in FIG. 26 (b), when both the multi-core connectors 100 (the multi-core fibers 113) are pressed toward each other (Fp in the drawing) from this state, the multi-core fibers 113 with the largest $h_1^j + h_2^j$ are butted together first. After that, the pressing force is increased so that as the butted multi-core fibers 113 transform due to elastic compression distortion, the multi-core fibers 113 in descending order of $h_1^j + h_2^j$ are butted together in turn.

Here, when $H = h_1^j + h_2^j$ (j=1–n) and $H^k$ is the k th largest H, the pressing force $F_1$ required for the multi-core fibers with $H^n$, which is the smallest H, can be expressed as in [Formula 1], wherein A represents a cross sectional area of the cladding of the multi-core fiber, E represents Young's modulus of the multi-core fiber, and l represents the elastically transformable length (l in FIG. 25).

$$F_1 = \frac{AE}{2l} \times \sum_{i=1}^{n-1} i \times (H^i - H^{i+1})$$ [Formula 1]

Figure 27A:
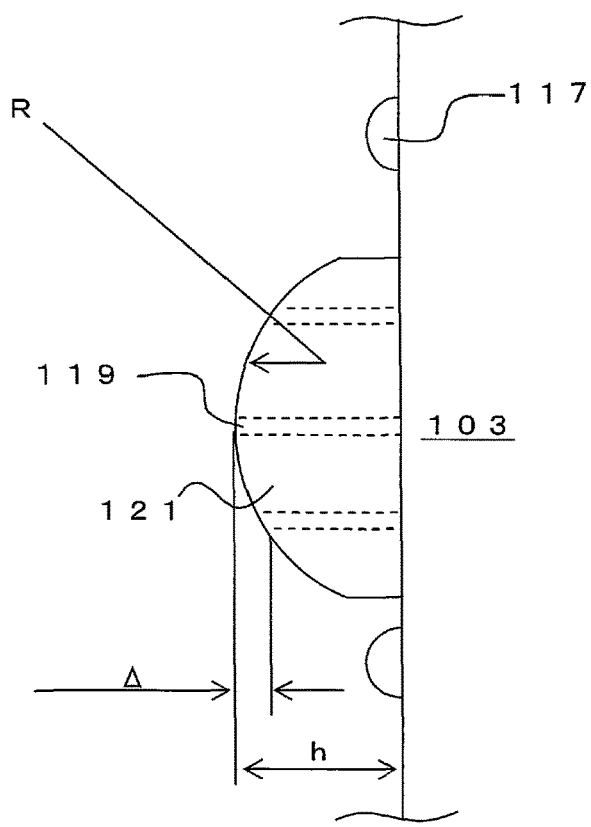
FIG. 27 (a) is an enlarged view of an end part of the multi-core fiber 113.
Figure 27B:
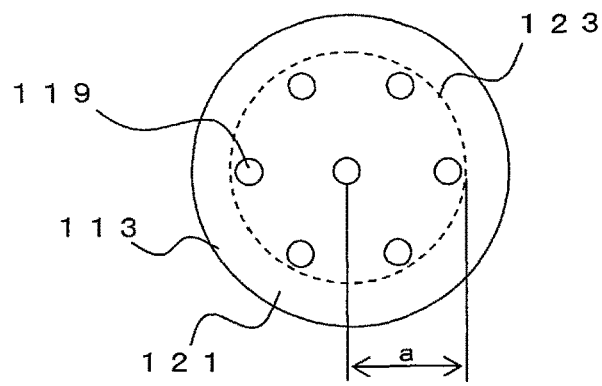

Next, conditions for physical contact of all the cores of each of the multi-core fibers 113 will be considered. FIG. 27 (a) is an enlarged view of B section in FIG. 24, which is an enlarged view of the tip part of the multi-core fiber 113. FIG. 27 (b) is a front view of the multi-core fiber 113.

As shown in FIG. 27 (b), the multi-core fiber 113 is an optical fiber having a substantially circular cross section, in which a plurality of cores 119 are arranged at predetermined regular intervals and its circumference is surrounded by a cladding 121 whose refractive index is lower than that of a plurality of the cores. For example, one of the total of seven cores 119 is disposed at the center of the multi-core fiber 113 and others are disposed at the vertexes of a hexagon surrounding the center core. That is, the center core 119 and the surrounding six cores 119 are all at regular intervals. Also, for the six of the cores 119, the distance between the adjacent cores 19 is also the same. The cores 119 become transmission paths for signal light. The arrangement of the cores 119 is not limited to the example shown in the drawing.

As mentioned above, the tips of a plurality of the multi-core fibers 113 protrude from the end face of the ferrule 103 for the predetermined length. As shown in FIG. 27 (a), the protrusion height of the multi-core fiber 113 (h in the drawing) is required to be fairly large. This is to reduce the influences of a filler 117 or the like, which is included in the ferrule 103, on the optical connecting part. To avoid the influence of the filler 117 as above, all the protrusion height h of the multi-core fiber 113 is preferably 5 μm or more. Securing the sufficient protrusion height h for the multi-core fibers 113 in this way can secure the physical contact between the multi-core fibers 113 with certainty, without being impeded by inclusions.

On the other hand, from a point of view of durability of the multi-core fiber 113 in repetitive attaching/detaching of the connectors, it is not preferable that the protrusion height h for the multi-core fiber 113 is too large. Thus, the protrusion height h for the multi-core fiber 113 is preferably 20 μm or less.

Here, as a method for protruding the tip of the multi-core fiber 113 from the end face of the ferrule 103, there is a method in which the end face of the ferrule 103 is buffed after the multi-core fiber 113 is fixed to the ferrule 103 (hereinafter, called as 'polishing for protrusion'). Buffing polish is a polishing using a polishing cloth made of fabric or paper infiltrated with paste abrasive or suspension. The ferrule 103, which is made of polishing resin, is polished preferentially so that only the multi-core fiber 113, which is made of glass (silica glass for example), can be protruded from the end face of the ferrule 103. Alumina may be used as the abrasive for example.

When the ferrule 103 is polished for protrusion as above, the polishing sagging of edge parts of the tip of the multi-core fiber 113 (approximately spherical shape) may likely occur. That is, R (radius of curvature) of the tip face of the multi-core fiber 113 decreases.

Here, as shown in FIG. 27 (b), in the front view of the multi-core fiber 113, the minimum circle that includes mode field diameters of all the cores 119 with the center of the multi-core fiber 113 as the center is regarded as a reference circle 123. That is, at least all the cores 119 are included inside the reference circle 123. Here, if the radius of the reference circle 123 is a, the difference between the protrusion margin at the part where the protrusion margin is maximum and the protrusion margin at the part where the protrusion margin is minimum inside the reference circle 123 (hereinafter, 'protrusion margin difference' in short) is regarded as $\Delta$.

If the amount of polishing for protrusion is increased so as to increase the protrusion height h, the protrusion margin difference $\Delta$ is increased linearly. That is, if there is an attempt to secure the protrusion height h more than a predetermined amount, the protrusion margin difference $\Delta$ of the tip part of the multi-core fiber 113 increases accordingly.

Figure 28A:
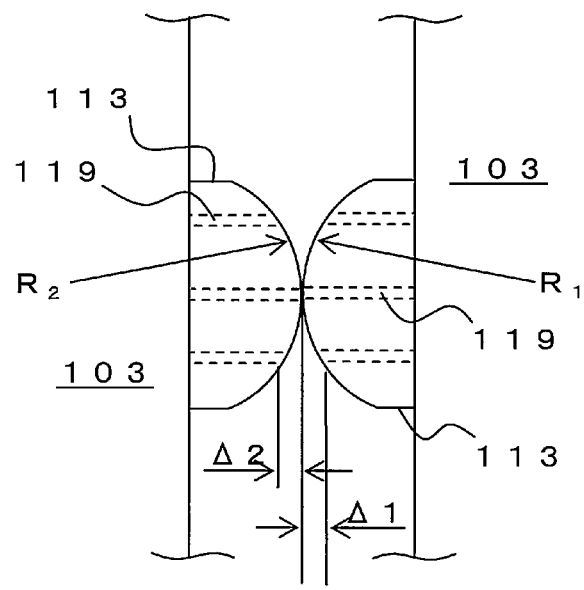
FIG. 28 (a) is a drawing showing a state in which the multi-core fibers 113 are facing each other and butted against each other.
Figure 28B:
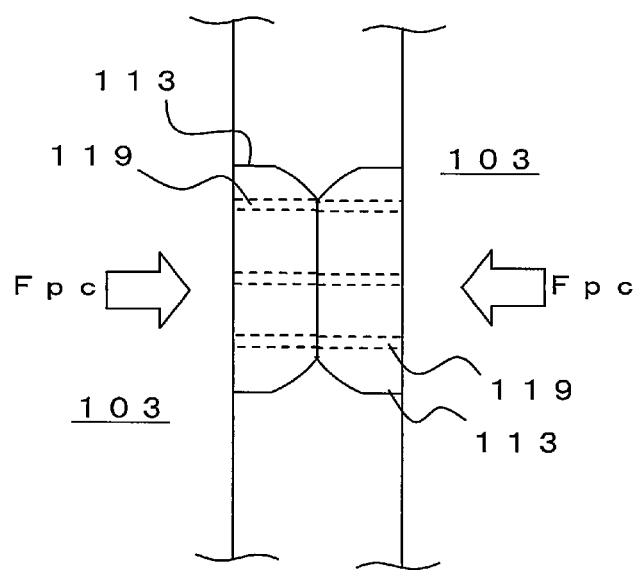

FIG. 28 (a) shows a state in which the multi-core fibers 113 are faced and butted to each other. The radii of curvature of the tip faces of the pair of the multi-core fibers 113 are $R_1$ and $R_2$ respectively. Also, the protrusion margin differences of the tips of the pair of the multi-core fibers 113 are $\Delta_1$ and $\Delta_2$ (μm) respectively. Also, the radius of each of the reference circles 123 (not shown in the drawing) is a (μm).

Pressing force Fpc (N) required to press the tips of the multi-core fibers 113 and bring all the cores 119 into physical contact from this state as shown in FIG. 28 (b) is expressed in the equation (1) according to the Hertz equation.

$$Fpc = (4a^3 E)/(3(1-v^2)) \cdot (R_1 + R_2)/(2R_1 R_2) \qquad (1)$$

wherein E represents Young's modulus of the multi-core fiber 113 and v represents Poisson ratio of the multi-core fiber 113.

The tips of the multi-core fibers 113 are pressed by an elastic member such as a connector spring (omitted in the drawing) included in the connector. That is, the ferrules are pressed toward their ends by the elastic member.

Since R>>a>>$\Delta$ is established at the tip of the multi-core fiber 113, it can be expressed as R≈$a^2$/2$\Delta$, and if this is substituted into the equation (1), the equation (2) can be obtained. From the equation (2), it can be said that Fpc is linear to ($\Delta_1 + \Delta_2$).

$$Fpc = (4aE)/(3(1-v^2)) \cdot (\Delta_1 + \Delta_2) \qquad (2)$$

Figure 29:
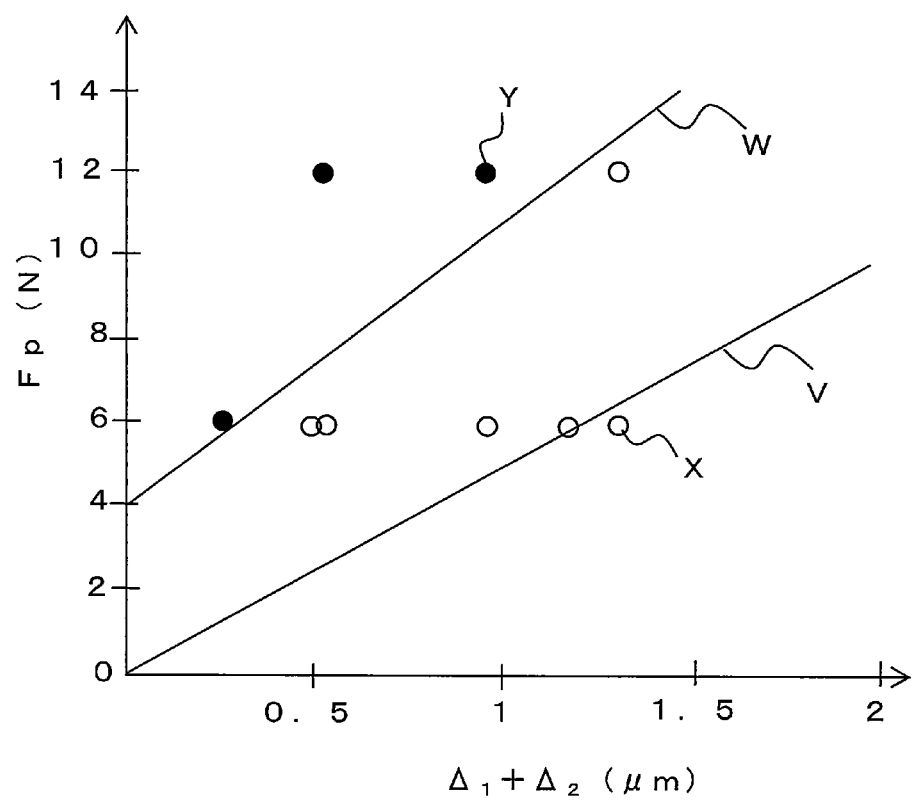
FIG. 29 is a graph showing a relationship between $\Delta_1+\Delta_2$ and $F_p$.

Meanwhile, the pressing force of the connector spring Fp was varied and its correlation with ($\Delta_1 + \Delta_2$) was evaluated as shown in FIG. 29. The white circles in the graph (X in the graph) are the ones that did not come to physical contact and the black circles (Y in the graph) are the ones that came to physical contact. The multi-core fiber 113 (the cladding 121) used has an outer diameter of 181.5 μm and the core pitch of 44.5 μm. Also, the mode field diameter for 1550 nm is 10.2 μm and the radius of the reference circle 123 is approximately 50 μm. Also, for simplification, the example shown in FIG. 29 evaluated whether physical contact between single-core multi-core fibers 113 is possible or not.

The straight line V in the graph is a theoretical straight line calculated from the equation (2) with Young's modulus E=71.5 GPa and Poisson ratio v=0.14. That is, theoretically, physical contact is expected to occur above the straight line V (on the side in which the pressing force of the connector spring is stronger). However, when the inventors actually evaluated, it turned out that the boundary of whether physical contact is possible or not was the straight line W.

The reasons for the straight line W, which is the actual boundary of whether physical contact is possible or not, to be shifted from the theoretical straight line V can be considered as below. First of all, the pressing force Fp of the connector spring is not zero when ($\Delta_1 + \Delta_2$)=0. This may be because not the entire pressing force Fp of the connector spring is used as the pressing force on the tips of the multi-core fibers 113 since there may be resistance between the guide pins of the connectors when inserted into each other and the like. That is, it can be said that the pressing force Fp of the connector spring=the pressing force Fpc applied to the multi-core fiber+the resistance force Fr of the connector.

The resistance force Fr of the connector used this time was approximately 4N. The resistance force Fr of the connector is dependent on the connector used. Thus, when setting the pressing force of the connector spring, Fr should be evaluated in advance and Fp may be set by adding Fr to the required pressing force for physical contact of the multi-core fibers 113.

Next, a difference between the inclinations of the straight line V and the straight line W will be considered. The inclination of the straight line W, which is the actual boundary of whether physical contact is possible or not, is larger than that of the theoretical straight line V. This may be because, for example, the tip shape of the multi-core fiber 113 is not in an ideal shape as shown in FIG. 27 (a) so that the positions of the center and the maximum point of the protrusion margin may be shifted, Δ may not be uniform in the circumferential direction of the reference circle, or the like. Therefore, it can be considered that as $\Delta_1+\Delta_2$ increases, the amount of deviation from the theoretical value increases, and as a result, the required pressing force Fpc is increased.

Accordingly, the inventors calculated a correction coefficient α for the inclination of the theoretical straight line V to be the inclination of the actual straight line W, and it was found that α=1.39.

Thus, if the number of the multi-core fibers is n, the condition for physical contact to occur can be expressed in the equation (3).

$$Fp \geq (4aE\alpha n)/(3(1-v^2))\cdot(\Delta_1+\Delta_2)+Fr \qquad (3)$$

Here, Fp=Fr+Fpc. Thus, the condition for physical contact to occur can be expressed in the equation (4).

$$Fpc \geq (4aE\alpha n)/(3(1-v^2))\cdot(\Delta_1+\Delta_2) \qquad (4)$$

As above, the pressing force required for all the cores to come into physical contact from the state in which the multi-core fibers 113 are in contact with each other is given by the equation (4). Thus, taking the above-mentioned variations in protrusion margin of the multi-core fibers 113 into consideration, the condition for contacting all the multi-core fibers 113 with each other and bringing all the cores of the multi-core fibers 113 to physical contact is expressed in the equation (5):

$$(Fp-F_1)/n \geq Fpc \qquad (5)$$

wherein Fp is the pressing force given to the ferrule.

Although it is possible to bring the cores into physical contact if the pressing force Fpc applied to the tips of the multi-core fibers 113 is increased, there is a limit to the pressing force that can be given to the tip of the multi-core fiber 113. In practice, the pressing force that can be given is approximately 4N per multi-core fiber 113. If the pressing force per multi-core fiber 113 exceeds 4N, the tip may be damaged. That is, it is expressed as Fpc (N)=4n.

Thus, the equation (3) can be expressed as the equation (6) when Young's modulus E=71.5 GPa, Poisson ratio v=0.14, and α=1.39 of the multi-core fiber 113 are substituted.

$$(\Delta_1+\Delta_2)\ (\mu m) \leq 29.6/a \qquad (6)$$

Also, if $\Delta_1$ and $\Delta_2$ are the same Δ, all the cores can be brought into physical contact when the condition of the equation (7) is satisfied.

$$\Delta\ (\mu m) \leq 14.8/a \qquad (7)$$

Here, if a=50 μm for example, all the cores can be brought into physical contact when the condition of Δ (μm)≤0.296 μm≈0.3 μm is satisfied.

Moreover, considering the feasibility and the possibility of measurement, the pressing force that can be given per multi-core fiber 113 is approximately 2N, and thus it is more preferable that the equation (8) is satisfied.

$$\Delta\ (\mu m) \leq 10.3/a \qquad (8)$$

Figure 30:
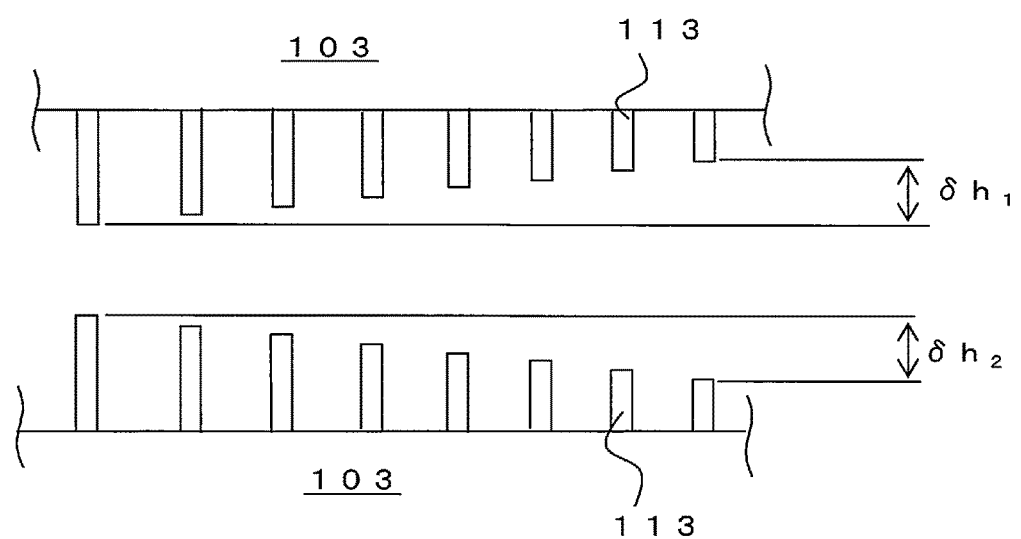
FIG. 30 is a drawing showing a state in which the multi-core fibers 113 are facing toward each other.

Next, the pressing force $F_1$ in consideration of the above-mentioned variations in the protrusion margin of the multi-core fibers 113 will be examined in detail. FIG. 30 is a schematic view showing a state in which the multi-core fibers 113 are arranged so as to be facing each other.

In manufacturing the multi-core connector 100, if the end face of the multi-core fiber 113 is polished for protrusion as mentioned above or cut with a laser cutter, the multi-core fiber 113 may likely to have a form in which the protrusion height of the multi-core fiber 113 is varied in steps with substantially equal distances as shown in the drawing. Thus, the step-type model shown in FIG. 30 will be examined hereinafter.

This model can be considered as in a moderate condition between the condition for $F_1$ to be the maximum (the protrusion height of only one core is small) and the ideal condition (all the protrusion heights are equal). Also, the model in the drawing is for butting the multi-core fibers with the minimum protrusion heights together and thus has further worse conditions.

The difference between the maximum protrusion height and the minimum protrusion height for each of the ferrules 103 are $\delta h_1$ and $\delta h_2$, respectively. Then, from the above-mentioned [Formula 1], $F_1$ is expressed in the equation (9).

$$F_1=AE\cdot(n/2)\cdot(\delta h_1+\delta h_2)/2l \qquad (9)$$

Here, if $\delta h_1=\delta h_2=\delta h$, $F_1$ is expressed in the equations (10).

$$F_1=AE\cdot(n/2)\cdot(\delta h/l) \qquad (10)$$

Also, an area of cross section A of the multi-core fiber 113 is $\pi d^2/4$, and thus $F_1$ is expressed in the equation (11).

$$F_1=(\pi E/8)\cdot(\delta h\cdot d^2\cdot n/l) \qquad (11)$$

Here, according to the equation (5), physical contact for all the cores can be achieved when $F_1+nFpc \leq Fp$. At this time, the elastic member inside the connector determines the pressing force Fp that can press the multi-core fibers 113 toward each other. That is, Fp is equal to or less than an effective pressing force yielded by the elastic member. Here, the effective pressing force is 80% of the elastic force that can be yielded by the elastic member. That is, it is the pressing force yielded in the 80% of the maximum displacement of the elastic member in the transformation within the elastically deformable range.

Thus, when the effective pressing force is X and with the substitution for $F_1$ and Fpc, the above equation can be expressed as the equation (12) (though α is not taken into consideration).

$$(\pi E/8)\cdot(\delta h\cdot d^2\cdot n/l)+(8aE\Delta n)/(3(1-v^2)) \leq X \qquad (12)$$

Here, as mentioned above, the pressing force that can be applied per multi-core fiber 113 is 2N considering the feasibility and the possibility of measurement, and Fpc=2 (N) (Δ=10.3/a) is substituted into the equation (12), which is then expressed as the equation (13).

$$(\pi E/8)\cdot(\delta h\cdot d^2\cdot n/l)+2n \leq X \qquad (13)$$

Thus, substituting Young's modulus E=71.5 GPa and summarizing the equation (13), the equation (14) can be obtained.

$$\delta h \cdot d^2/l \leq (X/n-2) \times 35.2 \quad (14)$$

Thus, if the equation (14) is satisfied, physical contact for all the multi-core fibers 113 can be obtained with certainty. In other words, the connector should be designed to satisfy the equation (14).

When the strength of the connector housing is taken into consideration, the maximum for X is thought to be approximately 40 N. Also, considering the elastic member that has been used for conventional connectors, X is supposedly about 22 N. Thus, δh or l should be set to satisfy the equation (14) with the above-mentioned value of X.

Figure 31A:
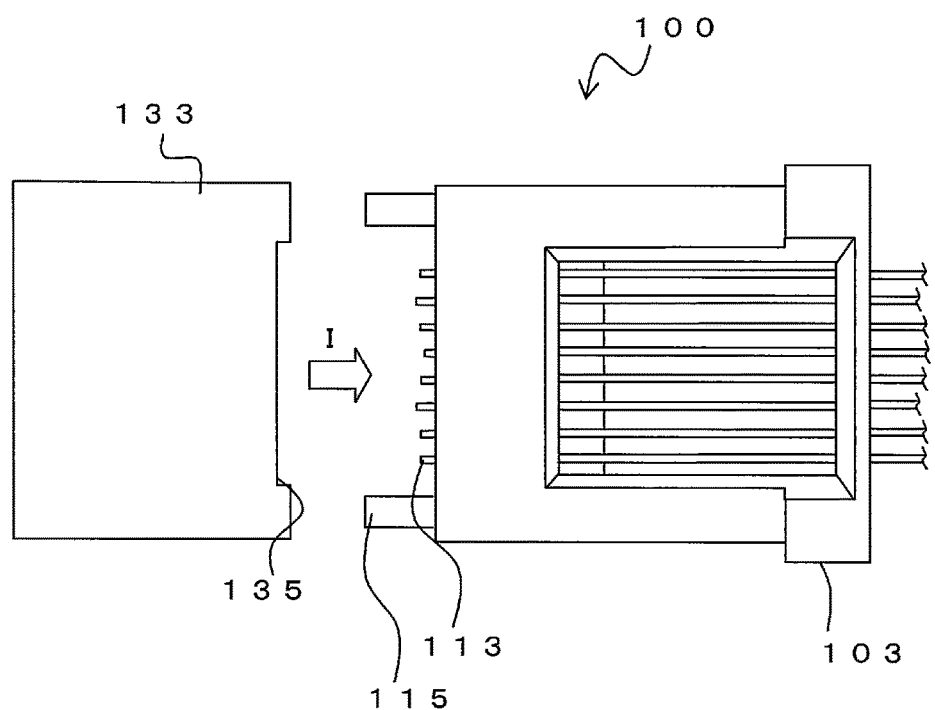
FIG. 31 (a) is a drawing showing an assembly process of the multi-core connector 100.
Figure 31B:
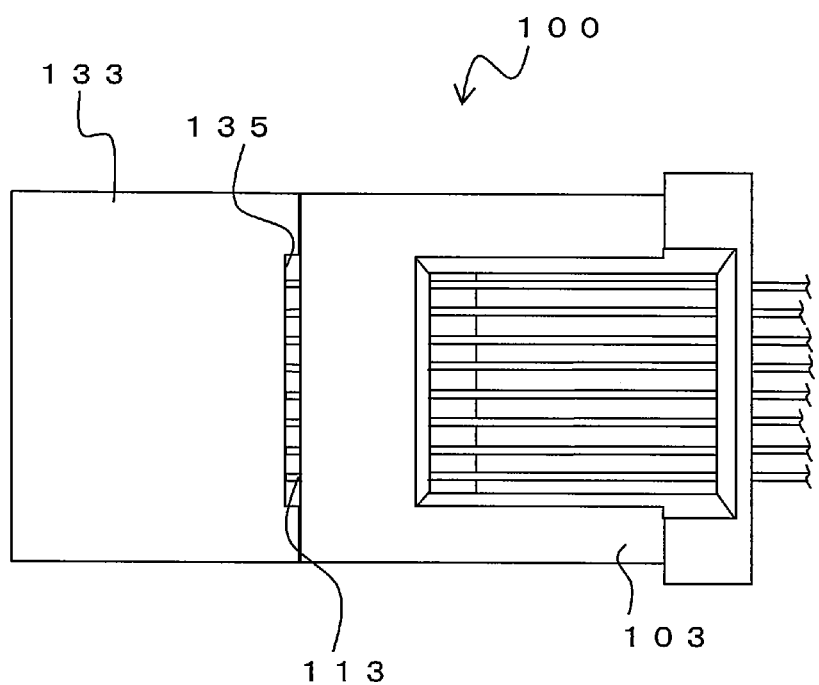

Next, a method for manufacturing the multi-core connector 100 will be described. As mentioned above, the multi-core fiber 113 can be protruded from the ferrule 103 by polishing for protrusion. Alternatively, in the present invention, the multi-core fiber 113 can be protruded as follows. First, as shown in FIG. 31 (a), a butting member 133 is disposed in the connecting direction of the ferrule 103 (the direction of protrusion of the tips of the multi-core fibers 113) and is butted against the ferrule 103 (an arrow I in the drawing). The butting member 133 is a member that includes guide holes that fit with guide pins 115, for example, and a recess portion 135 formed at the protruding range of the multi-core fibers 113.

As shown in FIG. 31 (b), when the butting member 133 is butted against the ferrule 103, a clearance due to the recess portion 135 is formed between the end face of the ferrule 103 and the butting member 133. Here, the multi-core fibers 113 are pushed in toward the tip end of the ferrule 103 so that the tip of each of the multi-core fibers 113 is butted against the butting member 133. Thus, the tip of the multi-core fiber 113 can be protruded from the end face of the ferrule 103 for the predetermined protrusion height according to the recess portion 135.

In this state, the fixing part 111 (FIG. 23 and the like) joins the multi-core fibers 113 and the ferrule 103. For example, an adhesive agent is applied to the part on which the fixing part 111 is to be disposed and then the fixing part 111 is pressed thereto.

After that, the multi-core fibers 113 may be further polished to even the protrusion height from the ferrule 103. Or, the multi-core fibers 113 may be cut using a laser cutter to even the protrusion height from the ferrule 103. In this way, as mentioned above, the protrusion height of the multi-core fibers 113 can be formed in steps of approximately equal distances.

Also, other than above methods, chemical etching can be used to even the protrusion height of the multi-core fibers 113 from the ferrule 103. Thus, in the present invention, any of the above methods may be used to even the protrusion height of the multi-core fibers 113 from the ferrule 103. With these methods, the protrusion height h can be controlled by the depth of the recess portion 135 of the butting member 133.

As above, according to the embodiments of the present invention, the multi-core fiber 113 is not adhered to the hole 107 of the ferrule 103 and is fixed at the rear part of the hole 107 so that the elastic transformable length l of the multi-core fiber 113 can be increased. Thus, even if there is any variation in the protrusion height of the multi-core fiber 113 from the end face of the ferrule 103, this variation can be absorbed with a smaller force.

Also, the connection structure which can secure physical contact with the connection target with certainty can be obtained by satisfying the relationship for the protrusion margin difference: Δ (μm)≤14.8/a. Also, securing the sufficient protrusion height h can suppress the influence of the fillers 117 and the like, which are on the end face of the ferrule 103, on the connection part at the tip of the multi-core fibers 113.

Also, by satisfying the relation: $\delta h \cdot d^2/l \leq (X/n-2) \times 35.2$, all the multi-core fibers 113 can be brought into physical contact with certainty. In this way, when the multi-core fibers 113 are butted with the connection target, the multi-core fibers 113 can be pressed against the connection target by the elastic compression distortion without buckling.

Also, using the butting member 133 enables to protrude the tips of the multi-core fibers 113 from the end face of the ferrule 103 for the predetermined amount. Thus, compared to the case in which the protrusion height h of the multi-core fibers 113 is formed only by polishing for protrusion, polishing sagging of the multi-core fibers 113 can be reduced. Also, polishing, cutting with a laser cutter, or chemical etching afterward can further diminish variation in the protrusion height of the multi-core fibers 113 from the end face of the ferrule 103.

The connector connection structure according to the present invention is not only for the case in which the multi-core connectors 100 are connected with each other but at least one of the connectors to be connected should be the multi-core connector 100. For example, in the other connector to be connected with the multi-core connector 100, the multi-core fiber 113 and the hole 107 of the ferrule 103 can be adhered to each other as in the conventional manner.

Figure 32:
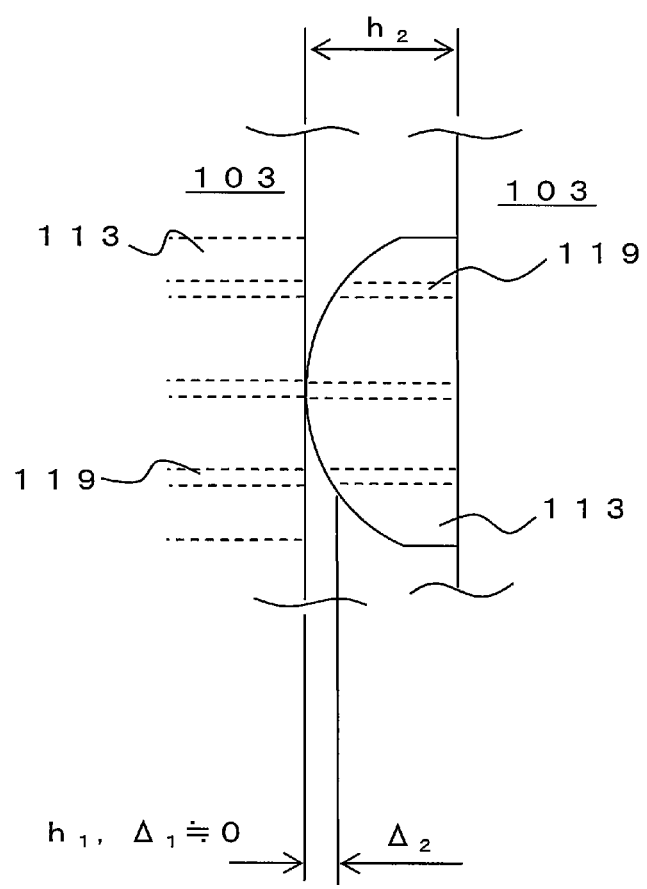
FIG. 32 is a drawing showing another embodiment for the state in which the multi-core fibers 113 are facing each other and butted against each other.

In this case, as shown in FIG. 32, among the multi-core connector 100 (on the right side of the drawing) and the other connector, which is a connection target, the protrusion height $h_1$ and the protrusion margin difference $\Delta_1$ of the other connector may be almost zero. The shape of such an end face of the multi-core fiber 113 with the almost zero protrusion height $h_1$ and protrusion margin difference $\Delta_1$ can be obtained by flat polishing the ferrule 103. Flat polishing can be performed, for example, by placing a polishing sheet or the like on a surface plate and polishing the tip of the multi-core fiber 113 vertically to the longitudinal direction of the multi-core fiber 113. That is, polishing is performed without using a buff or the like.

Flat polishing in this way can improve manufacturability. Also, since the protrusion margin difference $\Delta_1$ is almost zero, the above-mentioned Fpc can be decreased.

In this case, the protrusion margin difference $\Delta_2$ of the multi-core fiber 113 of the multi-core connector 100 should satisfy the relation: $\Delta_2$ (μm)≤29.6/a, or more preferably, $\Delta_2$ (μm)≤20.6/a.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

DESCRIPTION OF NOTATIONS 1, 1a, 1b, 1c, 1d . . . multi-core connector
3 . . . ferrule
5 . . . guide hole 7, 7a . . . hole
9 . . . opening
11, 11a, 11b, 11c, 11d, 11e, 11f, 11g, 11h . . . optical fiber holding member
12a . . . long surface
12b . . . short surface
13, 13a, 13b . . . optical fiber
15 . . . guide pin
17 . . . level difference
19 . . . core
21 . . . housing section
23 . . . flat portion
25a, 27b . . . recess portion
25b, 27a . . . protruding portion
29 . . . guiding portion
31 . . . pressing member
33 . . . butting member
35 . . . recess portion
37 . . . adhesive agent
39 . . . dummy fiber
41 . . . stress applying part
43 . . . ferrule aligning member
45 . . . slit
47 . . . light emitting/receiving element array
49 . . . light emitting/receiving part
100 . . . multi-core connector
103 . . . ferrule
105 . . . guide hole
107 . . . hole
111 . . . fixing part
113 . . . multi-core fiber
115 . . . guide pin
117 . . . filler
119 . . . core
121 . . . cladding
123 . . . reference circle
133 . . . butting member
135 . . . recess portion

What is claimed is:

1. A multi-core connector comprising:
a plurality of optical fibers having a circular cross section;
a plurality of optical fiber holding members, each optical fiber holding member comprising through holes into which respective optical fibers are inserted; and
a ferrule including a housing section that houses the plurality of optical fiber holding members, wherein
each optical fiber has an orientation in a rotational direction having the longitudinal direction as an axis of rotation at a cross section perpendicular to a longitudinal direction thereof;
each optical fiber holding member includes a rotation restraining part that restrains a rotation of the optical fiber holding member inside the housing section, the rotation having a longitudinal direction of the optical fiber holding member as an axis of rotation; and
each optical fiber holding member holds two optical fibers.

2. The multi-core connector according to claim 1, wherein:
a mark indicating the orientation of the optical fiber to be housed is formed on at least one of the optical fiber holding members.

3. The multi-core connector according to claim 1, wherein:
at least one of the optical fiber holding members is in a substantially rectangular column shape; and
when ah represents a width and bh represents a height of the at least one optical fiber holding member at a cross section perpendicular to the longitudinal direction of the at least one optical fiber holding member, the height hs of the housing section is greater than the height bh of the at least one optical fiber holding member, and θ is 1 degree or less in a relation: ah·sin θ+bh·cos θ=hs.

4. The multi-core connector according to claim 1, wherein:
a guiding portion is provided on the housing section, and at least one of the optical fiber holding members and the guiding portion are fitted with each other with a clearance in between; and
the clearance is set so that an angle of rotational allowance of the at least one optical fiber holding member against the guiding portion is 1 degree or less.

5. The multi-core connector according to claim 1, wherein:
there is no clearance provided between the housing section and at least one of the optical fiber holding members, and the rotation restraining part forbids the rotation of the at least one optical fiber holding member.

6. The multi-core connector according to claim 1, wherein:
the rotation restraining part is a flat portion that is formed on at least one part of an outer surface of at least one of the optical fiber holding members, and the rotation of the at least one optical fiber holding member is restrained by making the flat portion contact with a reference surface of the housing section.

7. The multi-core connector according to claim 1, wherein:
the rotation restraining part is a protrusion portion or a recess portion that is formed on at least one part of an outer surface of at least one of the optical fiber holding members, and the rotation of the at least one optical fiber holding member is restrained by fitting the protrusion portion or the recess portion into a recess portion or a protrusion portion formed on the housing section.

8. The multi-core connector according to claim 1, wherein:
each of the optical fibers protrudes from an end face of the ferrule for a predetermined amount.

9. The multi-core connector according to claim 8, wherein:
at least one of the optical fiber holding members is fixed to the ferrule with an adhesive agent; and
each of the holes and each of the optical fibers are not adhered to each other.

10. The multi-core connector according to claim 8, wherein:
an end face of the optical fiber protruding from and end face of the ferrule is polished.

11. The multi-core connector according to claim 1, wherein:
not all the holes have an optical fiber inserted and a vacant hole is provided.

12. The multi-core connector according to claim 1, wherein:
the optical fiber is a multi-core fiber including a plurality of cores.

13. The multi-core connector according to claim 1, wherein:
guide pins or guide holes are provided on both sides of a plurality of the optical fibers.

14. A multi-core connector comprising:
a plurality of optical fibers;
an optical fiber holding member that holds at least one of the optical fibers; and
a ferrule including a housing section that houses a plurality of the optical fiber holding members and a positioning mechanism that determines a position of a tip of the optical fiber protruding from an end face of the optical fiber holding member, wherein
each optical fiber has an orientation in a rotational direction having the longitudinal direction as an axis of rotation at a cross section perpendicular to a longitudinal direction thereof;
each optical fiber holding member includes a rotation restraining part that restrains a rotation of the optical fiber holding member inside the housing section, the rotation having a longitudinal direction of the optical fiber holding member as an axis of rotation;
the rotation restraining part is a dummy rod or a dummy fiber provided on the optical fiber holding member;
the dummy rod or the dummy fiber protrudes from an end face of the optical fiber holding member in the same direction as the optical fiber; and
the rotation of the optical fiber holding member is restrained by disposing the dummy rod or the dummy fiber at the positioning mechanism.

* * * * *